United States Patent [19]
Okumura

[11] Patent Number: 5,139,340
[45] Date of Patent: Aug. 18, 1992

[54] SINGLE POLARIZER, REFLECTIVE TYPE LIQUID CRYSTAL DISPLAY DEVICE WITH HIGH BRIGHTNESS AND CONTRAST RATIO

[75] Inventor: Osamu Okumura, Suwa, Japan

[73] Assignee: Seiko Epson Corporation, Tokyo, Japan

[21] Appl. No.: 624,156

[22] Filed: Dec. 7, 1990

[30] Foreign Application Priority Data

Dec. 8, 1989 [JP] Japan .................................. 1-319261
Mar. 24, 1990 [JP] Japan .................................. 2-74149

[51] Int. Cl.$^5$ ............................................. G02F 1/13
[52] U.S. Cl. ........................................... 359/63; 359/69; 359/70; 359/94
[58] Field of Search ............... 350/337, 338, 339 D, 350/350 R, 347 R; 359/63, 69, 70, 94, 10 C

[56] References Cited

U.S. PATENT DOCUMENTS

| | | | |
|---|---|---|---|
| 4,266,859 | 5/1981 | Togashi | 350/338 |
| 4,340,277 | 7/1982 | Kaufmann et al. | 359/99 |
| 4,378,955 | 4/1983 | Bleha, Jr. et al. | 359/49 |
| 4,492,432 | 1/1985 | Kaufmann et al. | 350/338 |
| 4,904,060 | 2/1990 | Grupp | 350/338 X |
| 5,018,837 | 5/1991 | McKee et al. | 350/337 X |

FOREIGN PATENT DOCUMENTS

| | | | |
|---|---|---|---|
| 131216 | 1/1985 | European Pat. Off. | |
| 2449602 | 4/1976 | Fed. Rep. of Germany | 350/338 |
| 2647991 | 12/1977 | Fed. Rep. of Germany | 350/338 |
| 2856170 | 6/1980 | Fed. Rep. of Germany | |
| 0013422 | 1/1982 | Japan | 350/338 |
| 0027238 | 2/1982 | Japan | 350/337 |
| 0095326 | 6/1983 | Japan | 350/338 |
| 188828 | 7/1989 | Japan | |
| 1312527 | 12/1989 | Japan | 350/350 R |
| 2143336 | 2/1985 | United Kingdom | |

OTHER PUBLICATIONS

Kmetz, "Single Polarizer Twisted Nematic Display", SID 79 Digest, May 10, 1979, pp. 126–127.
Kmetz, "A Single-Polarizer Twisted Nematic Display", Proceeding of the SID, vol. 21, No. 2, 1980, pp. 63–65.
Scheffer et al, "Optimum Polarizer Combinations for Twisted Nematic Displays", Conference, Oct. 1976, pp. 53–60.
Japan Display, '89, Oct. 16, 1989, "New Twisted Nematic ECB (TN-ECB) Mode for a Reflective Light Valve", O. Okumura et al., pp. 192–195.

Primary Examiner—Stanley D. Miller
Assistant Examiner—Huy K. Mai
Attorney, Agent, or Firm—W. Douglas Carothers, Jr.

[57] ABSTRACT

A reflective type liquid crystal display device is achieved with enhanced brightness and contrast ratio utilizing only one polarizing plate or polarizer and a refelctor in combination with a liquid crystal cell wherein the light propagating through the liquid crystal cell to the reflector is substantially of linear polarization. By employing a single polarizer, the effective brightness and contrast of the display can be increased by about 12% and the multi-coloring effect in a monochromatic black/white display can be significantly reduced. To obtain an ideal brightness level, linearly polarized light, which enters the liquid crystal cell through the single polarizer, is required to be transmitted twice through the liquid crystal layer and then passed again through the polarizer under the same conditions as in the case of obtaining linear polarization utilized in the transmissive type mode employing two parallel polarizing plates. In a futher embodiment of the invention, the multi-coloring effect can be further reduced or resolved by providing a light scattering surface on the reflector.

9 Claims, 15 Drawing Sheets

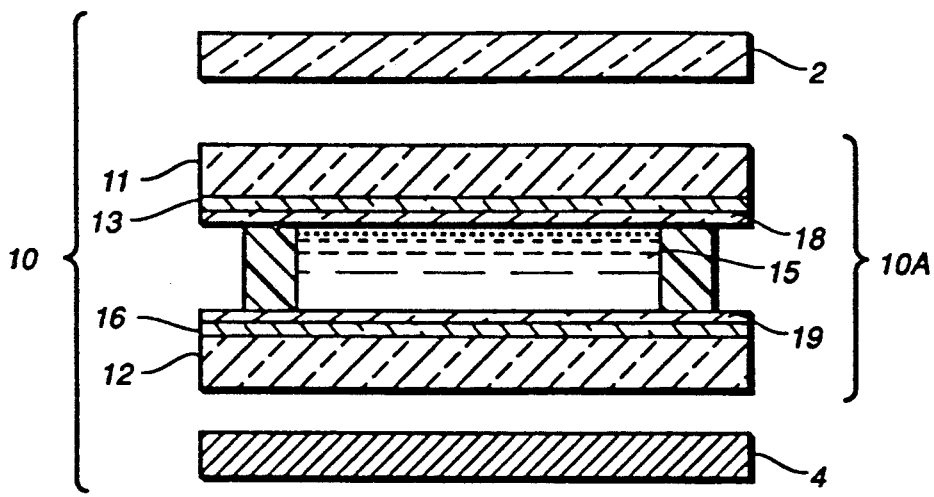
FIG._1
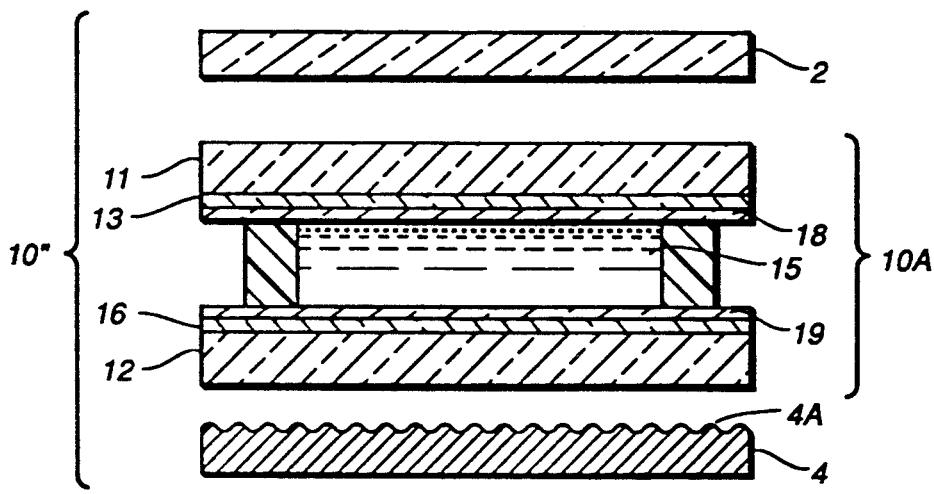
FIG._1A
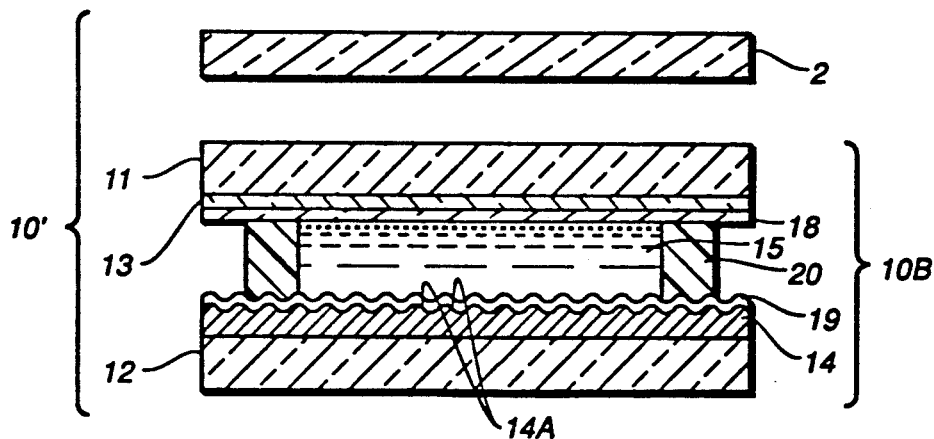
FIG._2

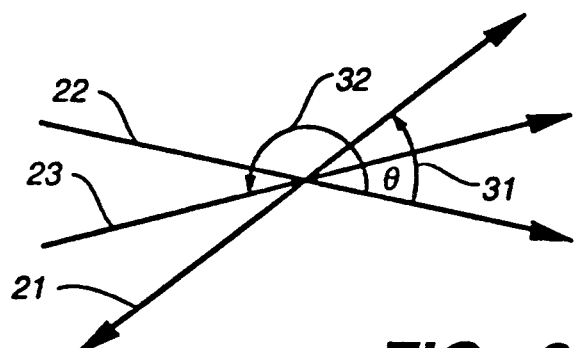
FIG._3
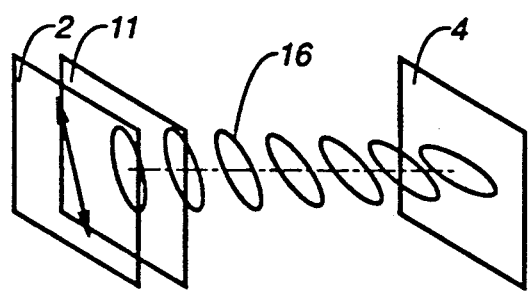
FIG._4A
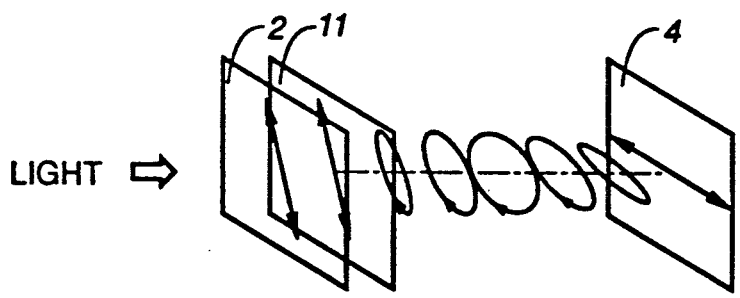
FIG._4B

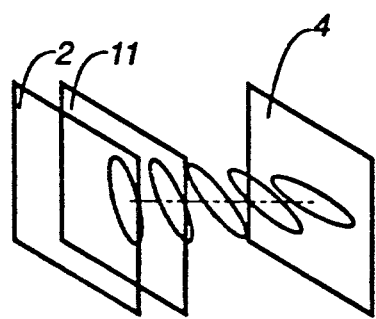
FIG._5A
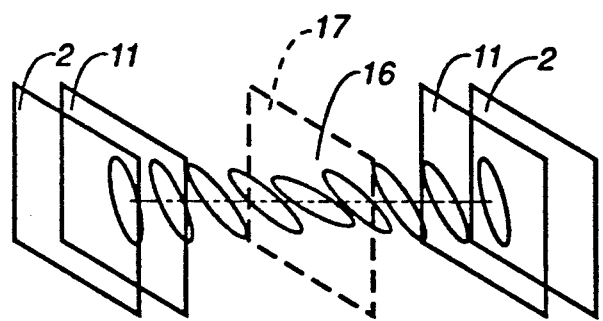
FIG._5B
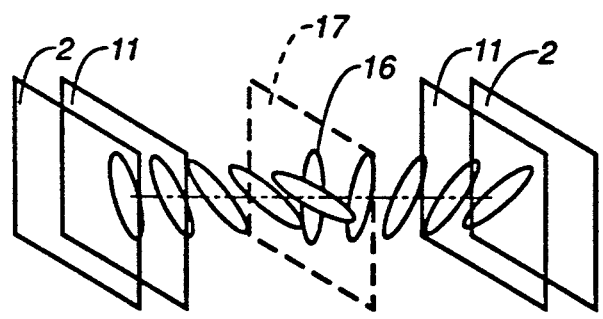
FIG._5C
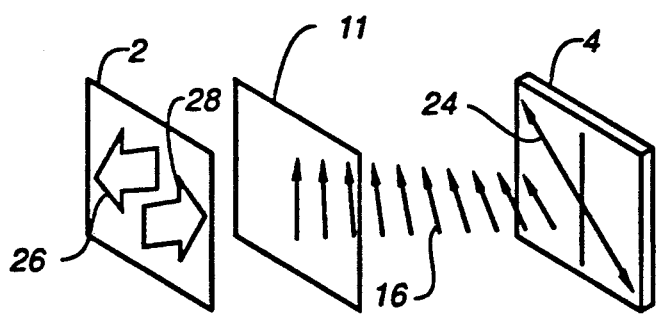
FIG._5D

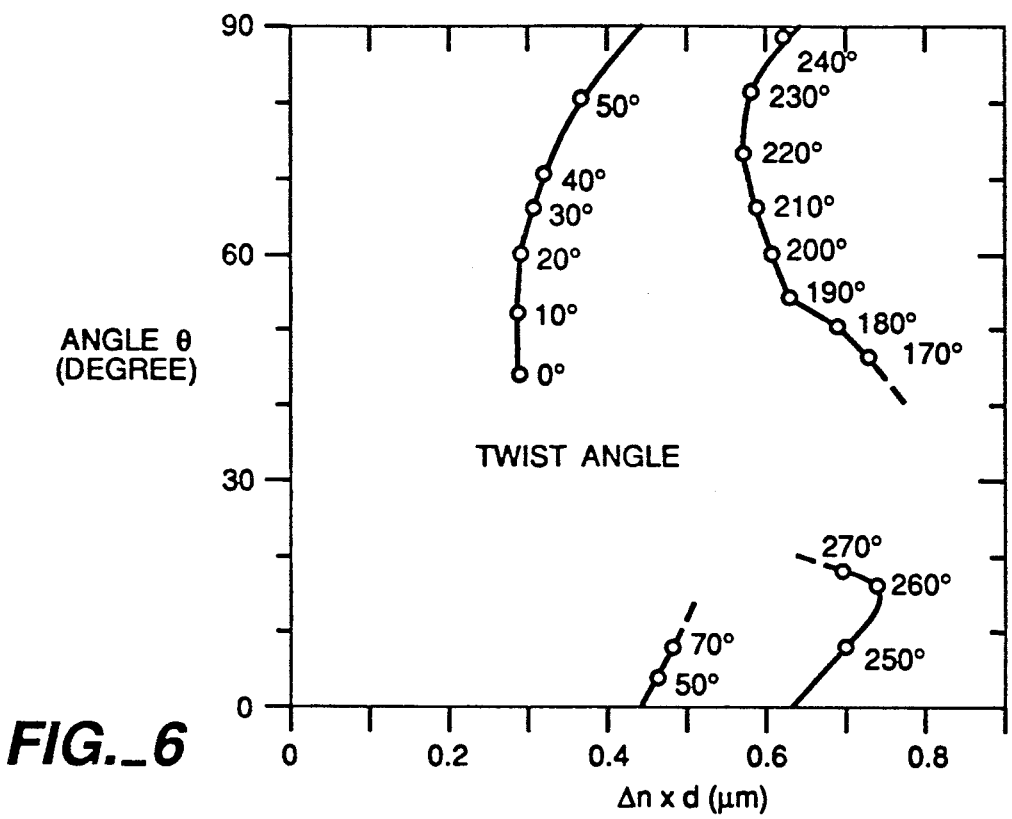
FIG._6
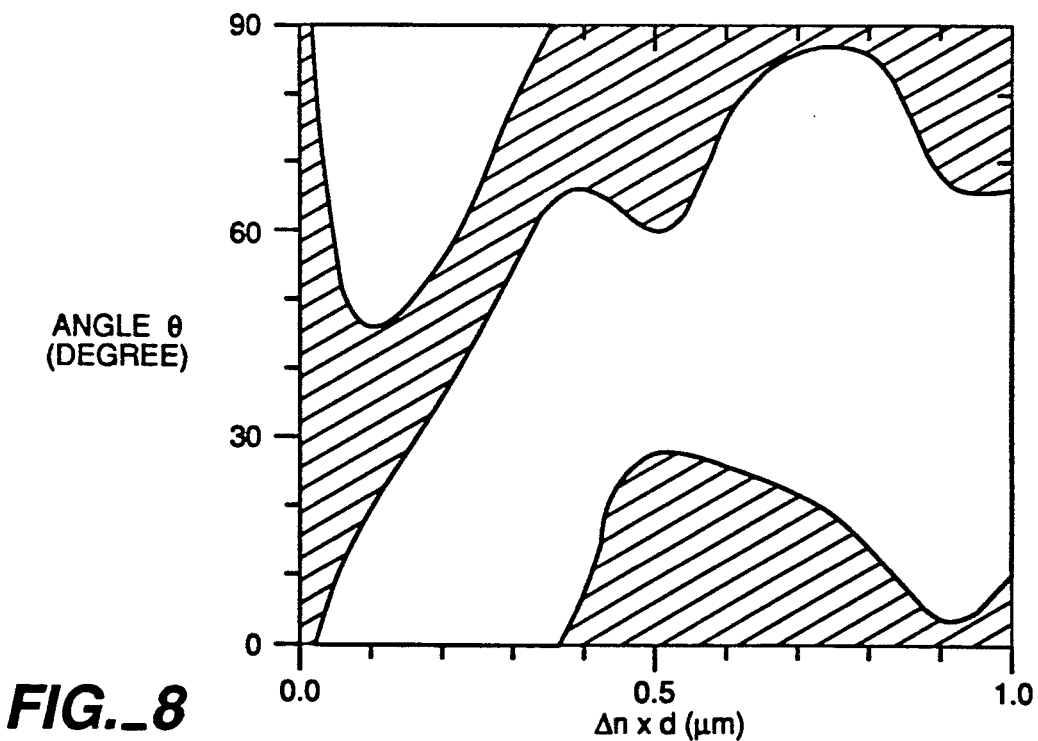
FIG._8

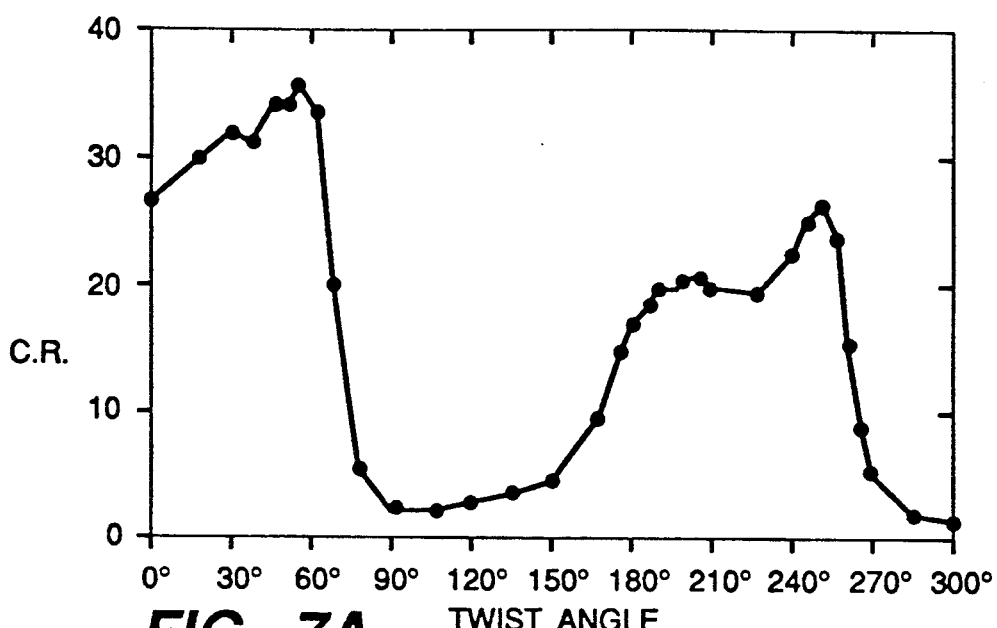
FIG._7A
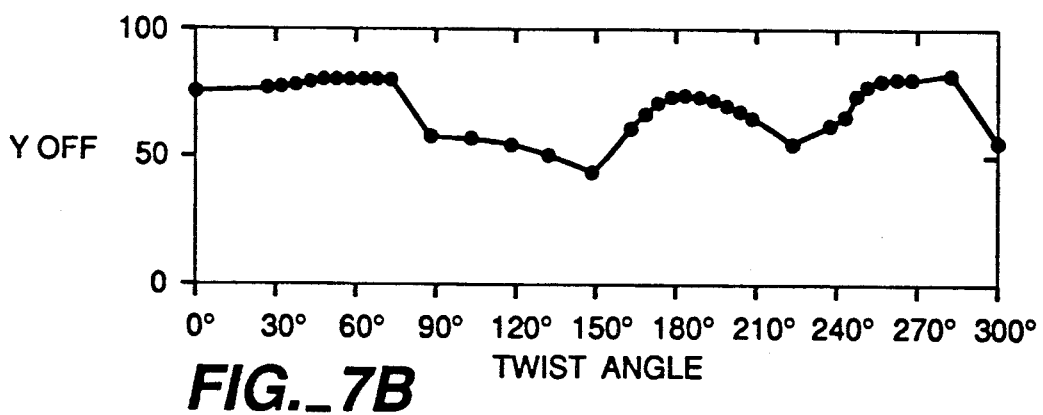
FIG._7B
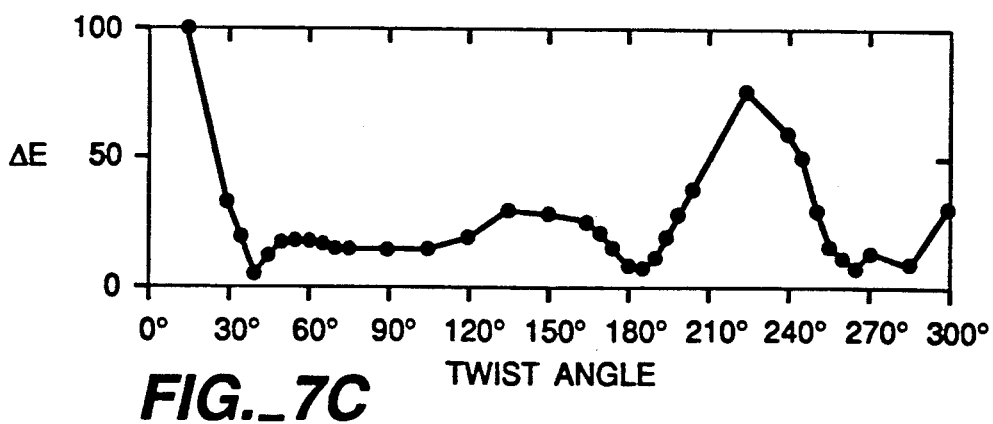
FIG._7C

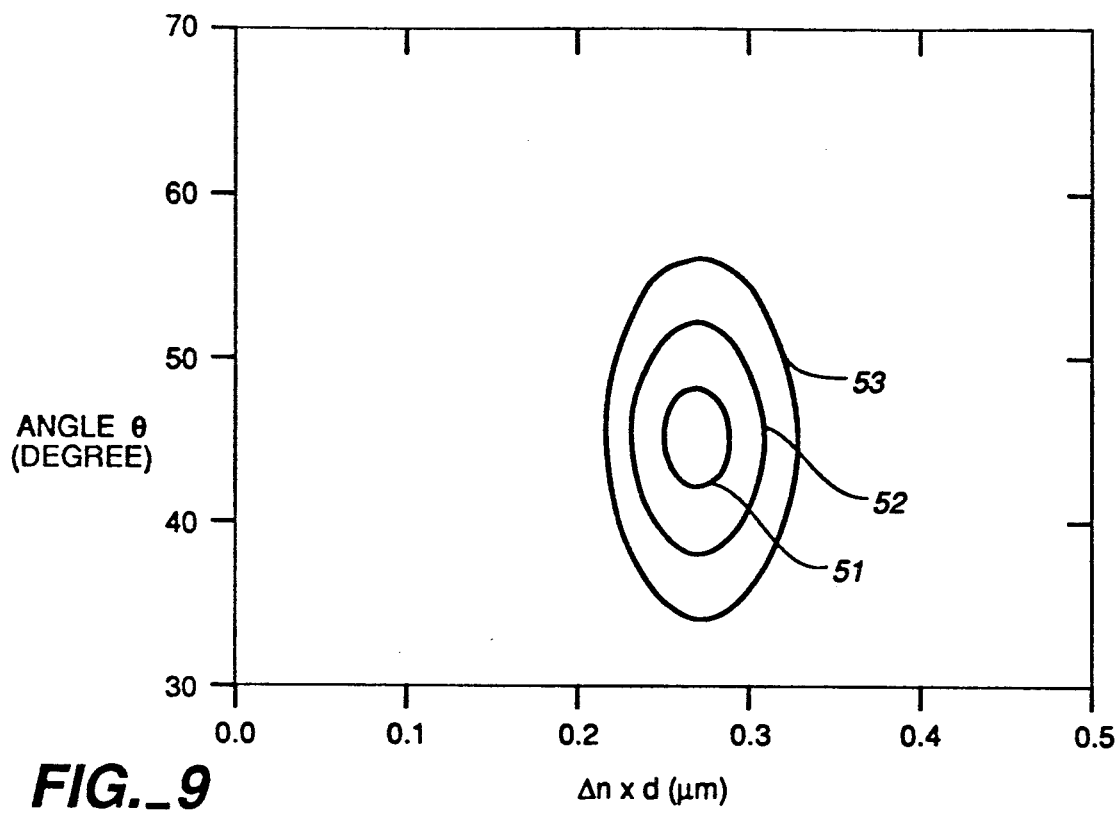
FIG._9
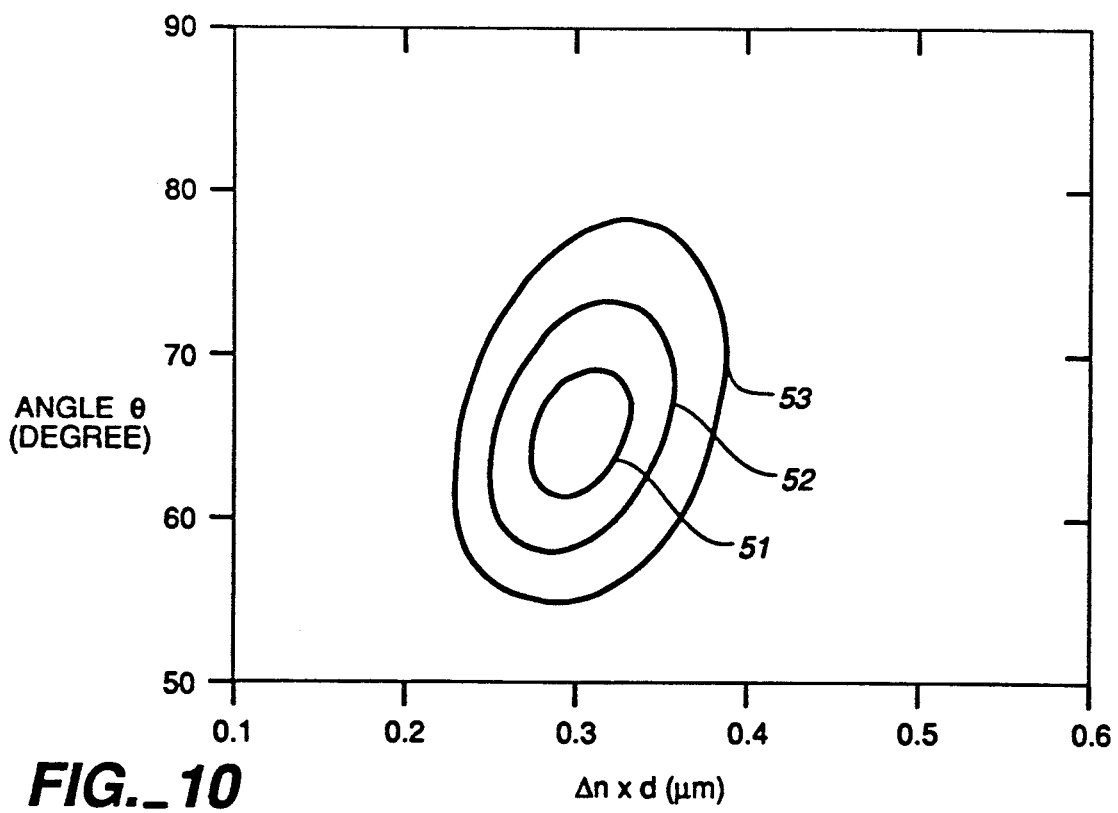
FIG._10

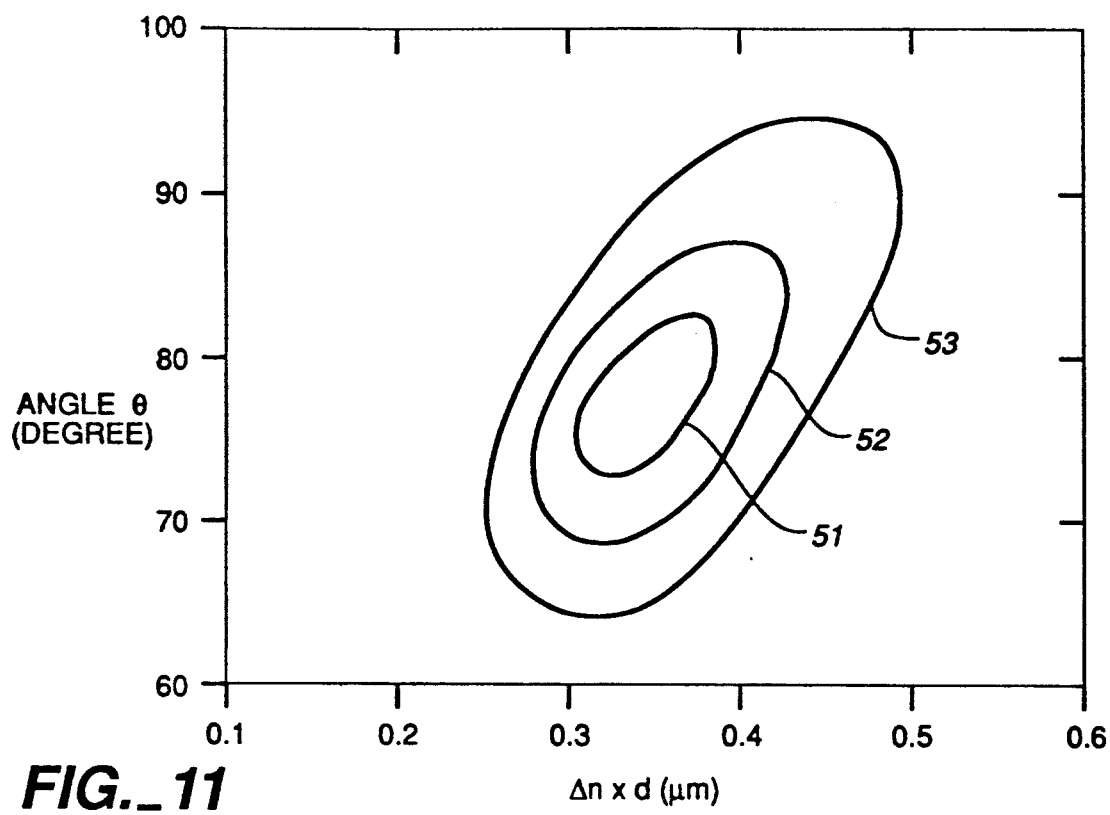
FIG._11
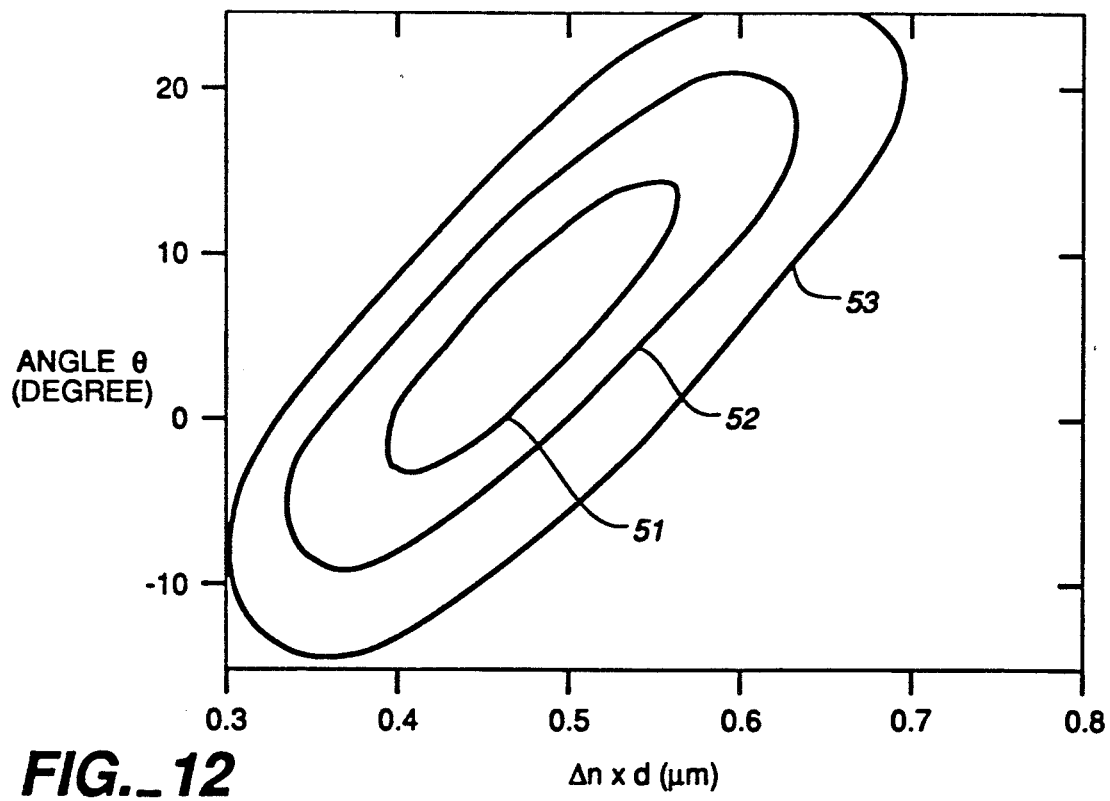
FIG._12

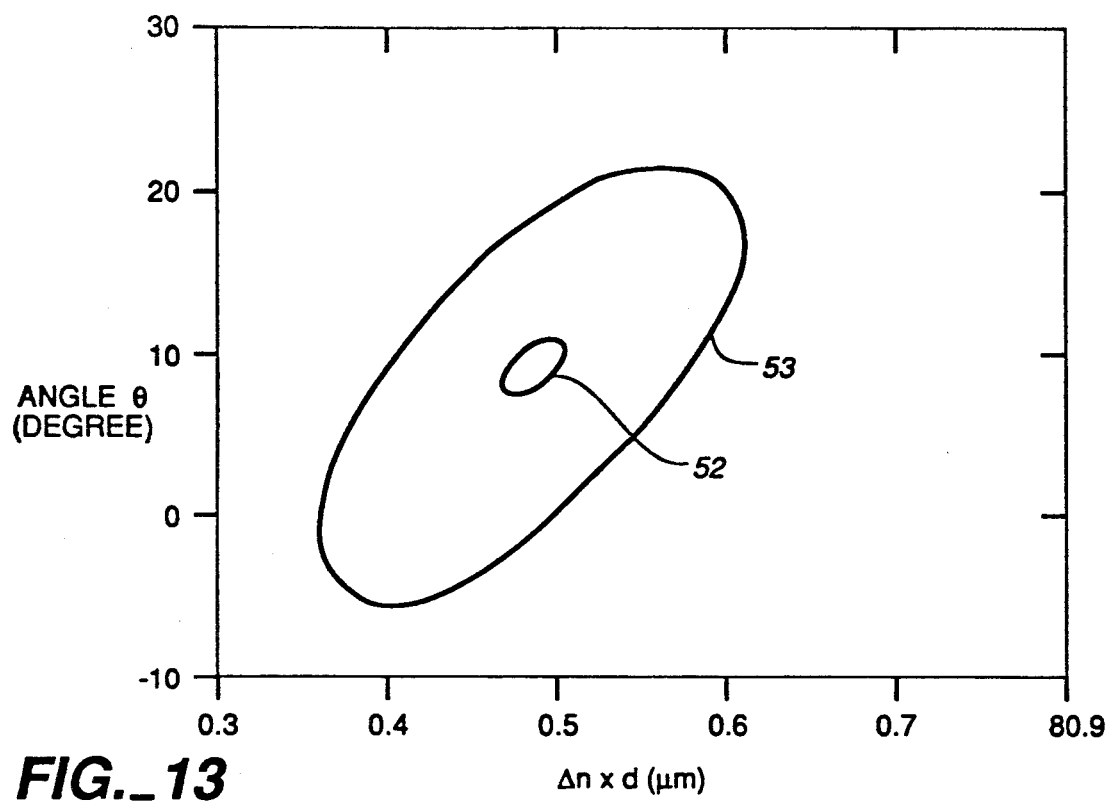
FIG._13
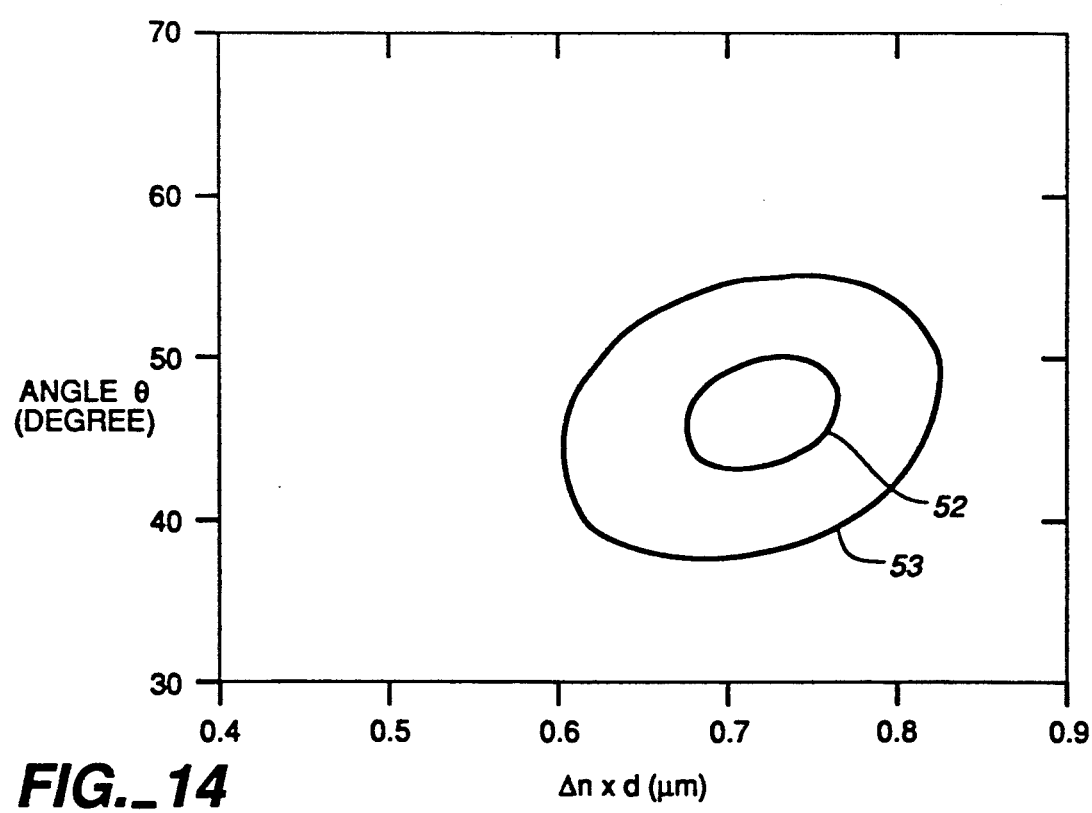
FIG._14

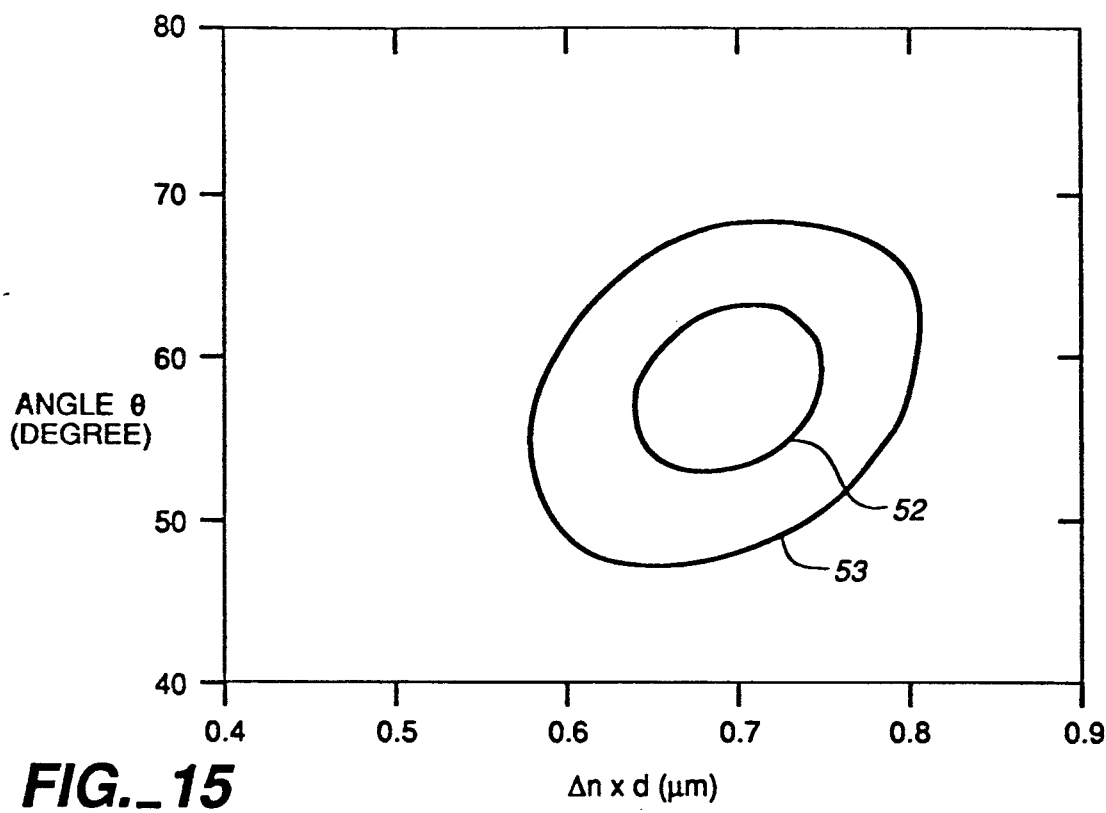
FIG._15
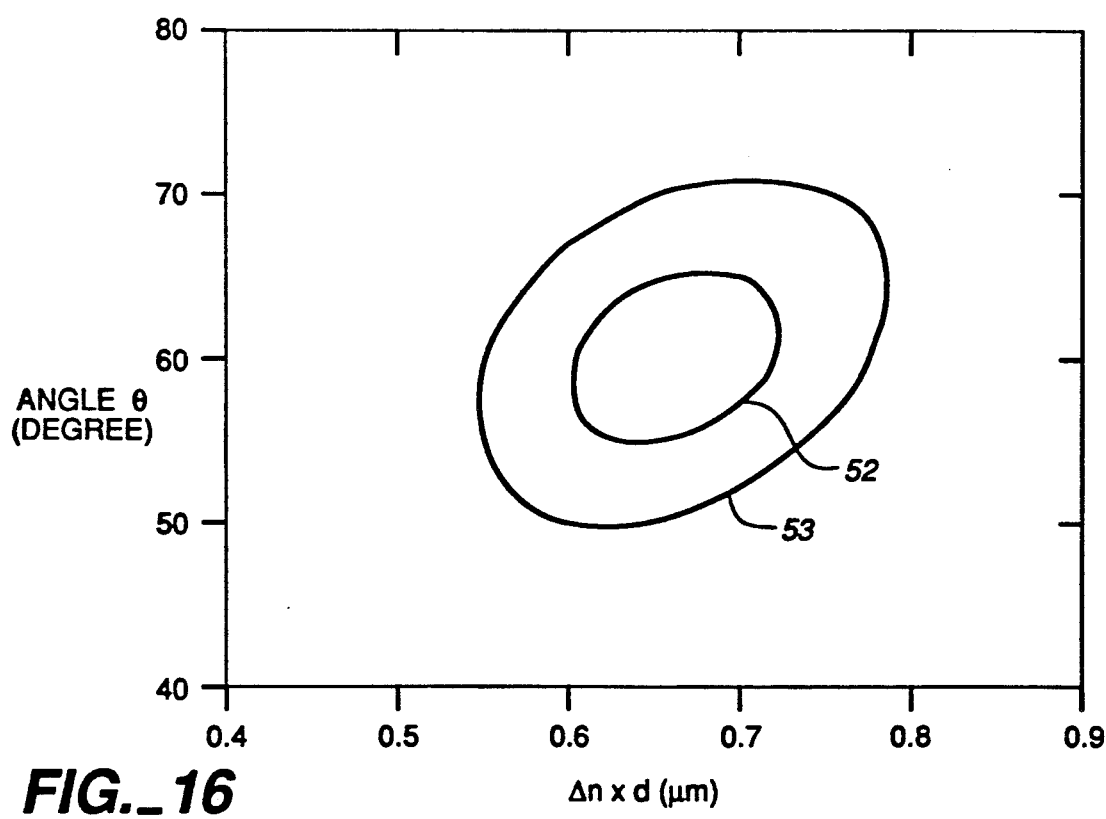
FIG._16

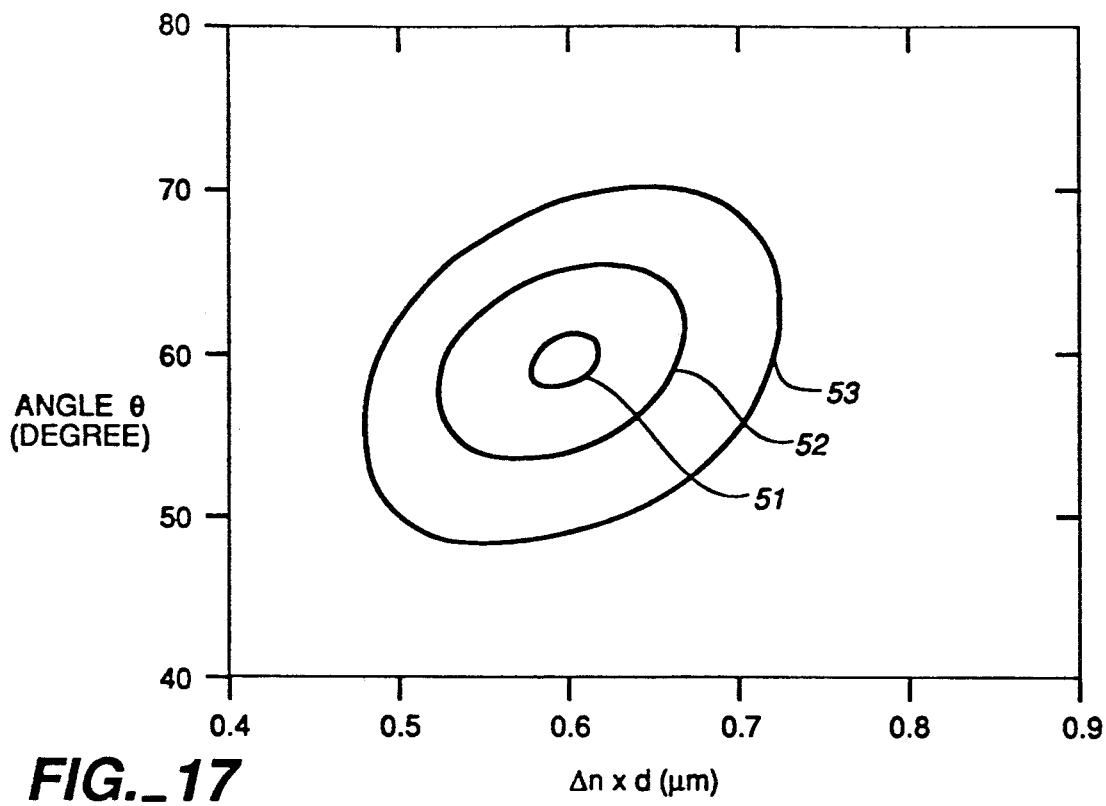
*FIG._17*
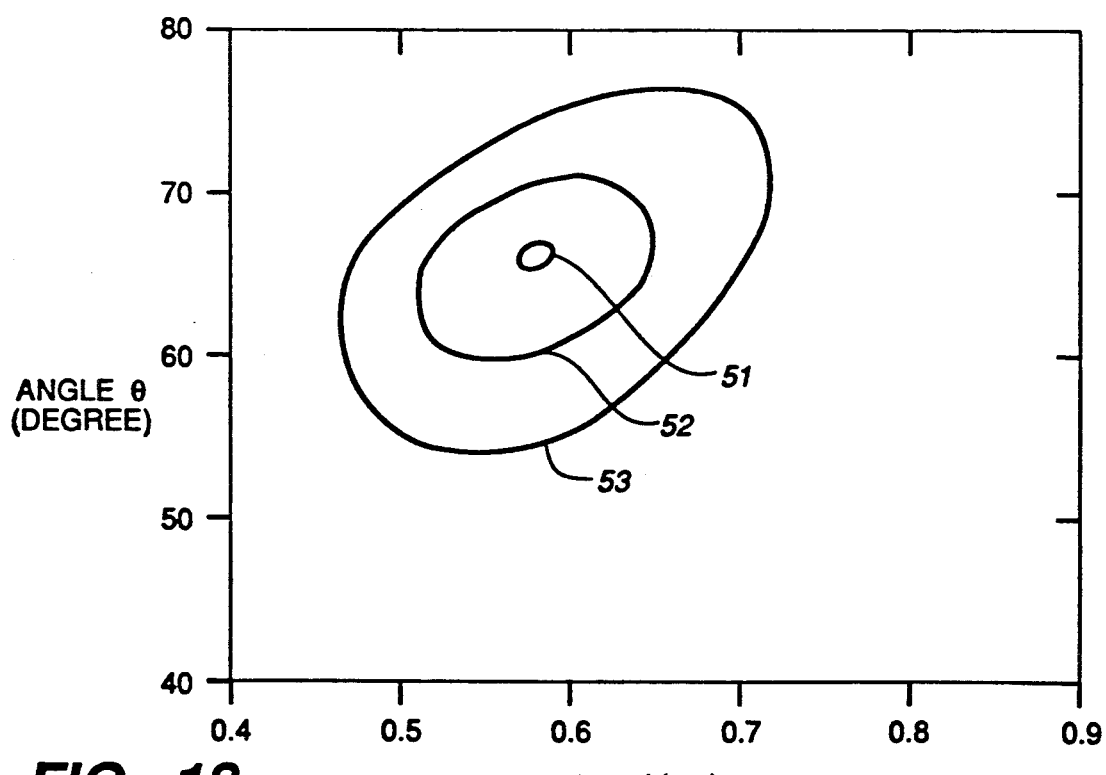
*FIG._18*

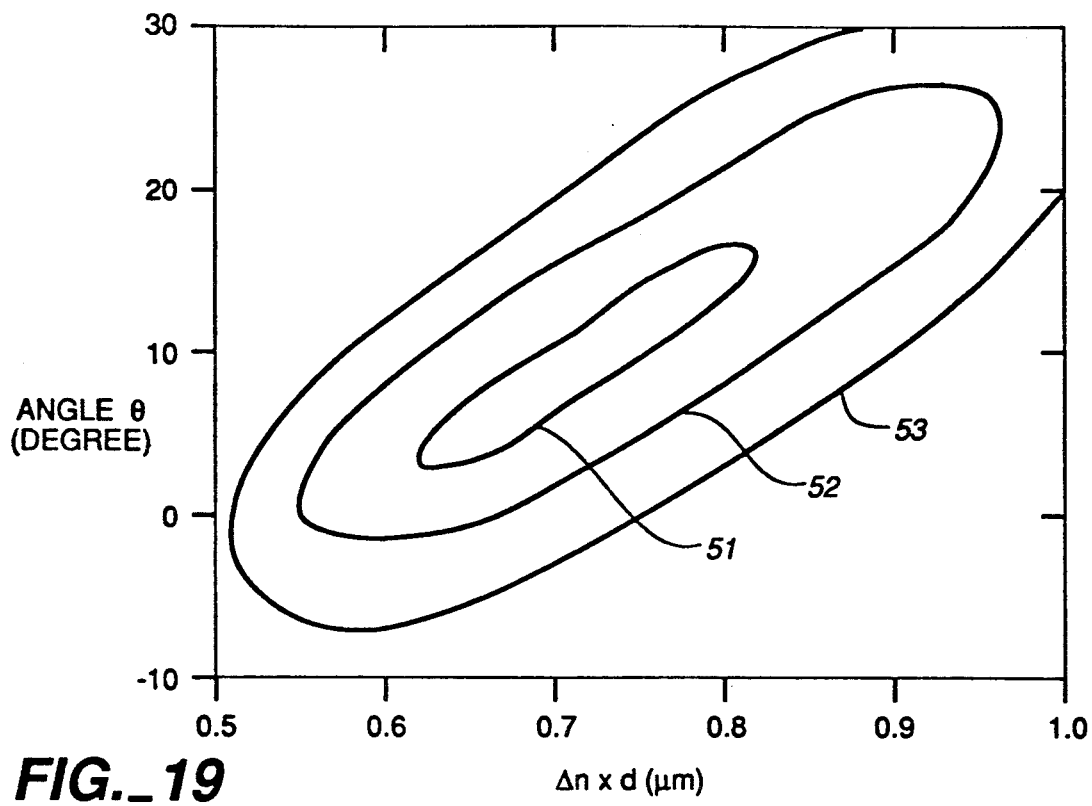
FIG._19
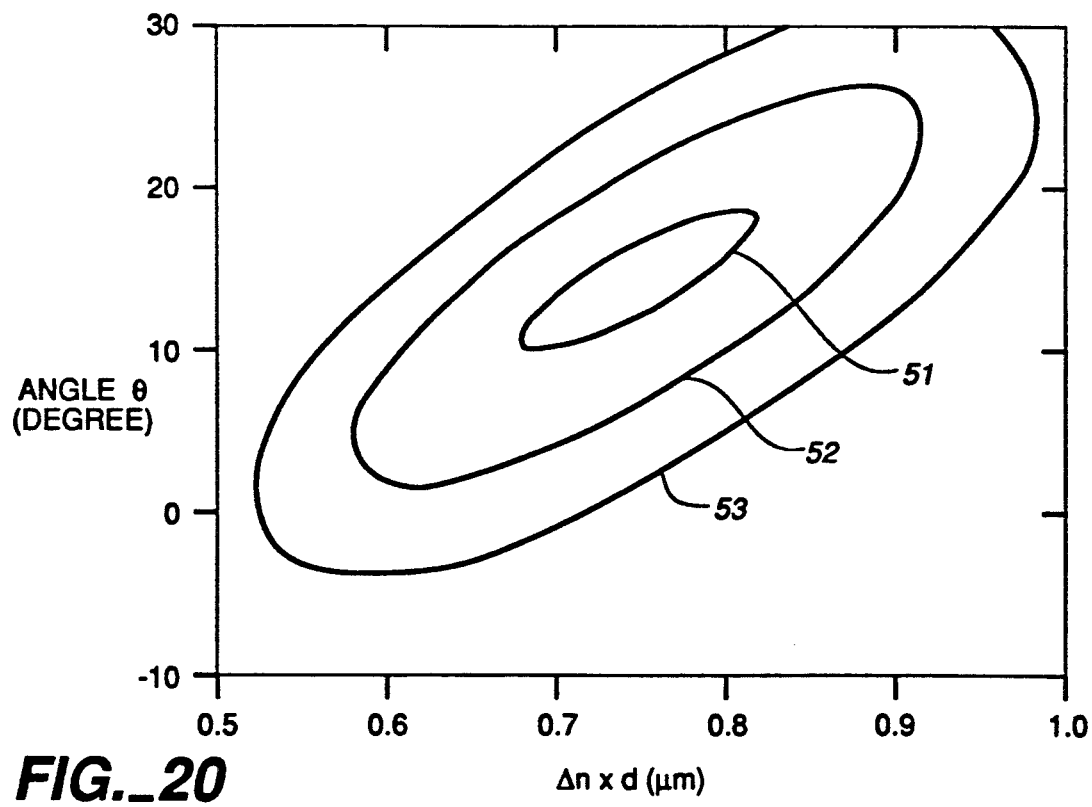
FIG._20

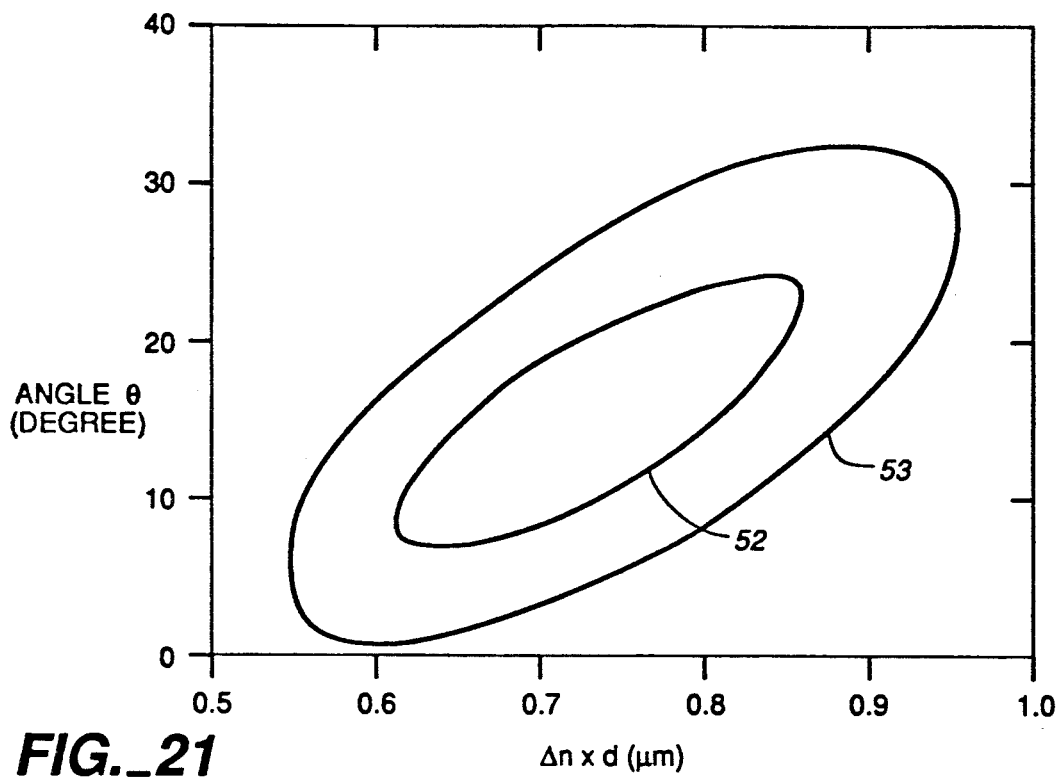
FIG.__21
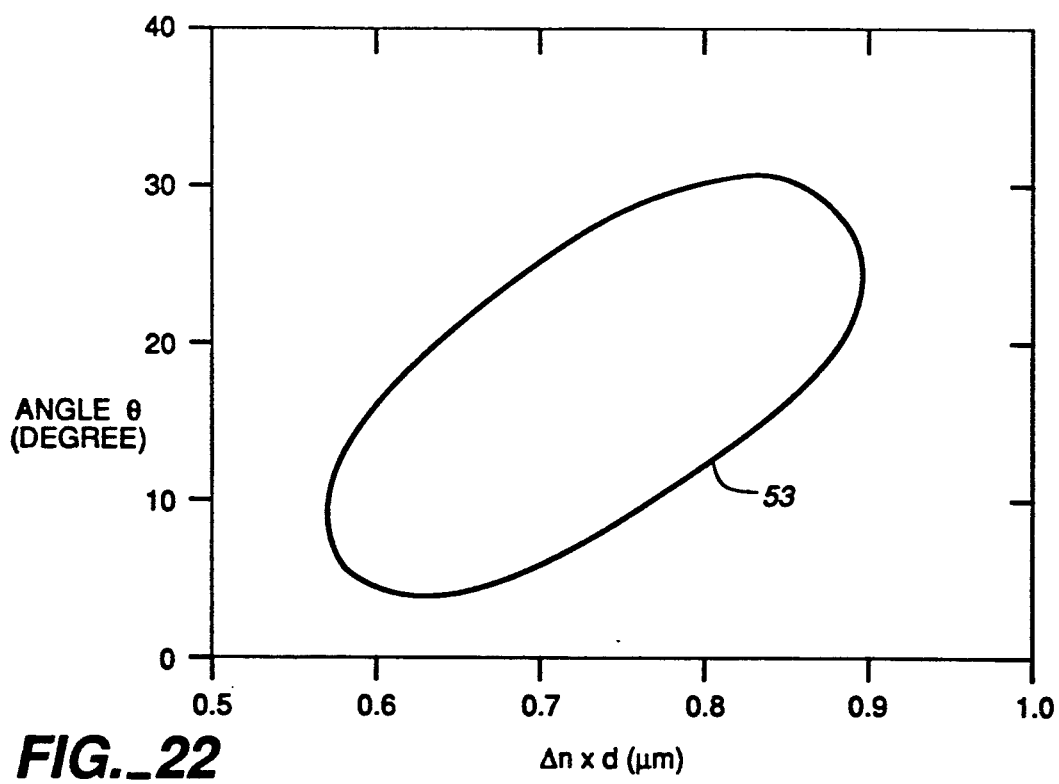
FIG.__22

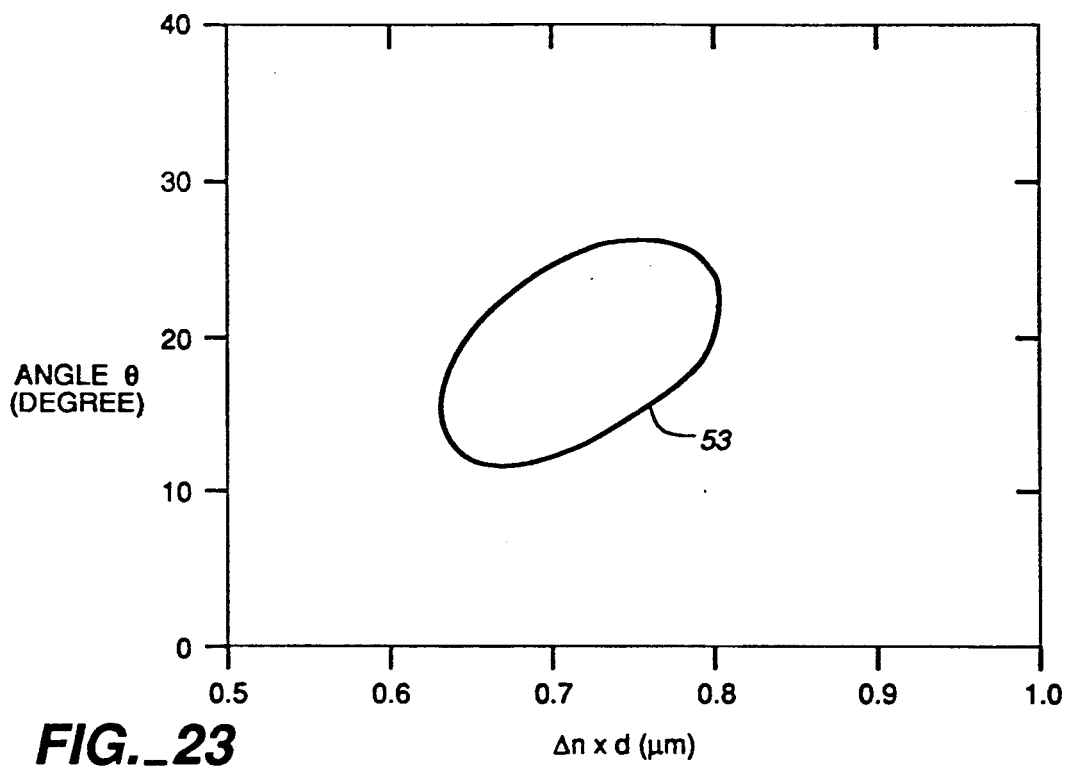
FIG._23
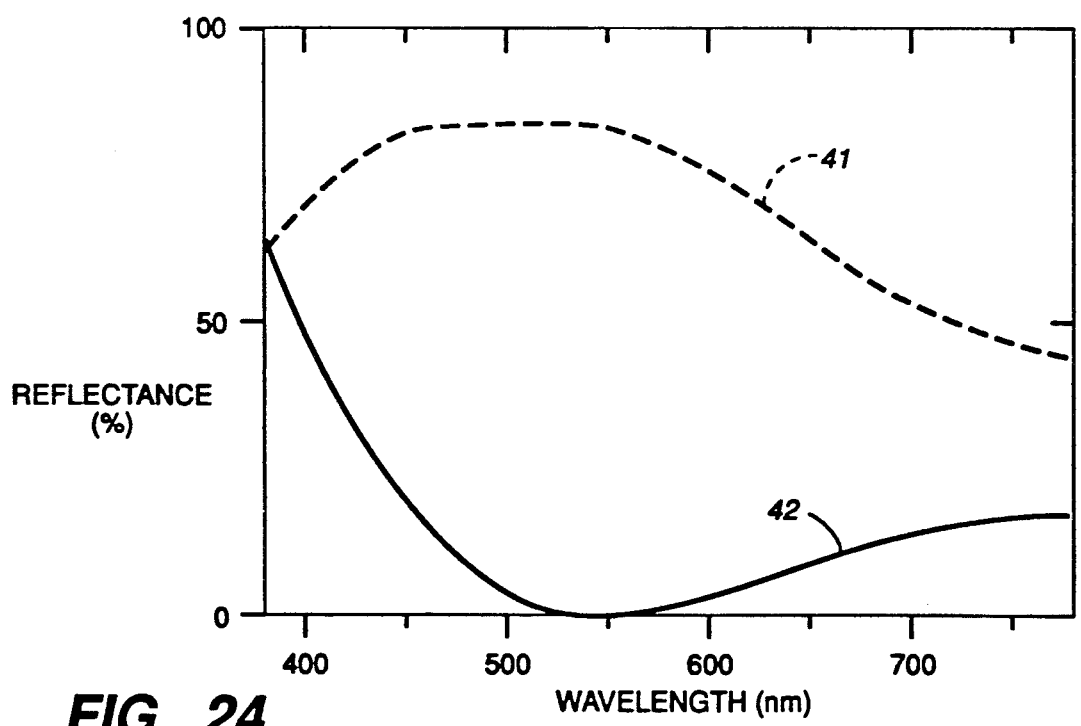
FIG._24

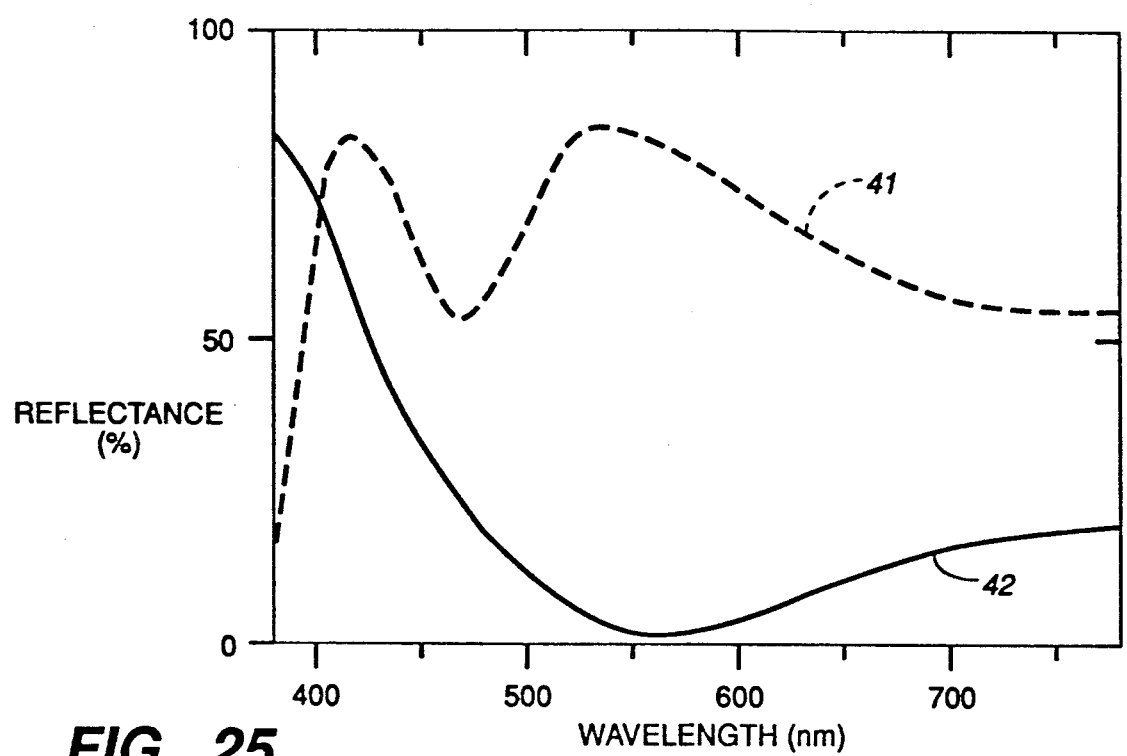
FIG._25
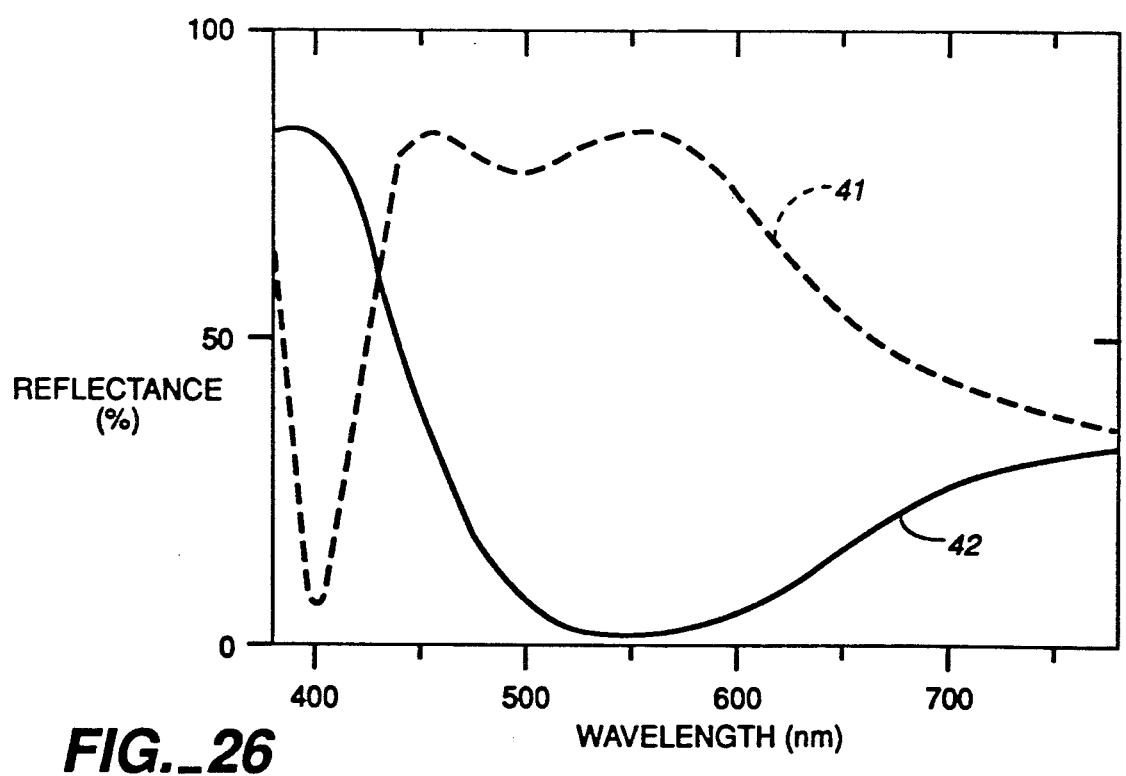
FIG._26

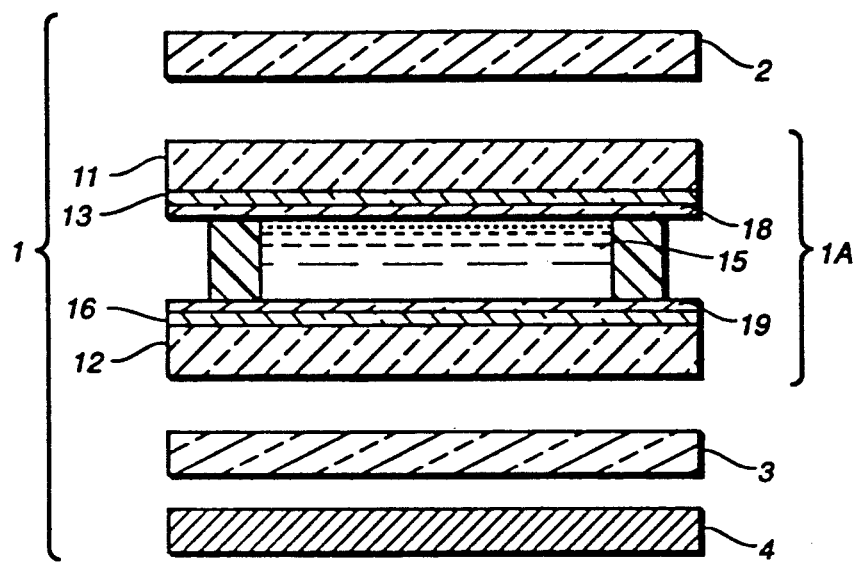
FIG._27
*(PRIOR ART)*
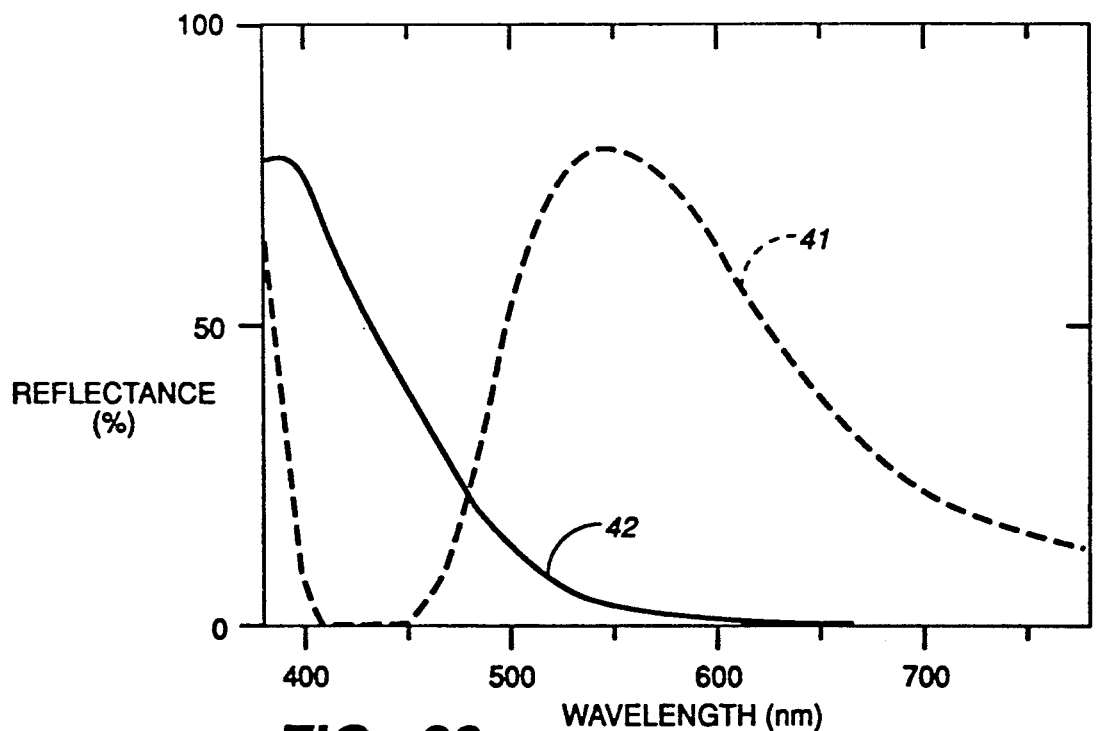
FIG._28
*(PRIOR ART)*

SINGLE POLARIZER, REFLECTIVE TYPE LIQUID CRYSTAL DISPLAY DEVICE WITH HIGH BRIGHTNESS AND CONTRAST RATIO

BACKGROUND OF THE INVENTION

The present invention relates to a liquid crystal display device and more particularly to a liquid crystal display device of the reflective type having an improved level of brightness.

The conventional reflective type TN mode and reflective type STN mode have been widely employed in portable type personal computers and word processors principally because they do not require backlighting and are of low power consumption. An example of a conventional liquid crystal display device 1 is illustrated in FIG. 27 with which the reflective type TN mode and the reflective type STN mode are employed. Liquid crystal device 1 includes upper and lower polarizing plates 2 and 3, reflecting plate 4 and a liquid crystal cell 1A. Liquid crystal cell 1A comprises upper and lower transparent substrates 11 and 12 spatially separated by means of spacer 20 forming an interior region for optically anisotropic liquid crystal material 15. A first transparent electrode 13 is disposed on the interior surface of upper substrate 11 and a second transparent electrode 16 is disposed on the interior surface of lower substrate 12. Orientation film 18 is disposed on the interior surface of electrode 13 and orientation film 19 is disposed on the interior surface of electrode 16. Reflecting plate 4 is provided relative to the exterior or outer surface of polarizing plate 3. Polarizing plates 2 and 3 are respectively disposed on the exterior surfaces of upper and lower substrates 11 and 12. This type of conventional double polarizer liquid crystal display device suffers from being too dark in displayed image and, especially in the case of the monochromatic black and white, reflective type STN mode, the displayed image is cause to be viewed in different colors on the display. Furthermore, there is the phenomenon of a double vision or imaging present in the displayed image, which is peculiar to the reflective type mode liquid crystal display device. The double image is caused by the presence of the lower display substrate which causes a reflected shadow of the displayed image from the lower substrate surface where the reflector is located. As a result, from the viewpoint of visual observation, there is a displayed image from the liquid crystal cell together with an offset shadow of the same image from the lower substrate, the offset being according to the thickness of the lower substrate.

FIG. 28 shows the spectral characteristics of the reflective type STN liquid crystal display device 1 in the case where an applied electric field to the display is turned ON and OFF. The display in this case is considered to be turned OFF when there is no or very little voltage applied to electrodes 13 and 16 resulting in no or insignificant change in orientation of the liquid crystal molecules within liquid crystal material 15. The display is considered to be turned ON when the applied voltage to electrodes 13 and 16 is sufficient to cause a change in orientation of the liquid crystal molecules within liquid crystal material 15. As a result, the optical transmission path of light through cell 1A is altered between conditions when the display is ON and OFF. In FIG. 28, the spectral characteristics indicated at 41 are the case when the electric field is turned ON and the spectral characteristics at 42 are the case when the electric field is turned OFF. An example of the conditions for this particular liquid crystal display device 1 is a twist angle of 255°, a retardation, $\Delta n \cdot d$, (wherein retardation, $\Delta n \cdot d$, is the product of birefringence, $\Delta n$, and the layer thickness, $d$, of liquid crystal material 15) is 0.85 $\mu$m, an angle formed relative to the polarizing or absorbing axis direction and the rubbing direction of 45°. The colors present on the displayed image relative to the STN mode are yellow-green when the display is turned OFF and blue when the display is turned ON. Further, the average light reflectance from the display was only 65%, which is relatively low for good display visibility and contrast.

It is an object of this invention to provide a reflective type liquid crystal display device with substantially enhanced brightness of the displayed image.

It is another object of this invention to provide a reflective type liquid crystal display device, particularly of the TN and STN mode, that reduces, and can significantly resolve, multi-coloring effect, i.e., is substantially a monochromatic display of contrasting dark and light.

It is another object of this invention to provide a reflective type liquid crystal display device, particularly of the TN and STN mode, that reduces, and can significantly resolve, double vision or imaging of the displayed image.

OBJECT AND SUMMARY OF THE INVENTION

According to this invention, a reflective type liquid crystal cell has a twist orientated liquid crystal sandwiched between a pair of transparent substrates in opposed relation together with a single polarizing plate, or polarizer and a reflecting plate or film, or reflector wherein a liquid crystal material allows incident light directed through the liquid crystal cell and reflected from the reflector to be substantially of linear polarization. In a preferred form of the invention, the direction of polarization of light relative to the reflector is substantially parallel or perpendicular to the longitudinal direction, i.e., the rubbing direction, of the liquid crystal molecules adjacent or nearest to the reflector.

The reflective type liquid crystal display device of this invention provides means for improving the brightness of the display and, in achieving this objective, only one polarizer is employed vis a vis the conventional employment of two such polarizing plates. By employing a single polarizer, the effective brightness of the display can be increased by about 12%. To obtain an ideal brightness level, linearly polarized light, which enters the liquid crystal cell through the single polarizer, is required to be transmitted twice through the liquid crystal layer and then passed again through the polarizer under the same conditions as in the case of obtaining linear polarization utilized in the transmissive type mode employing two parallel polarizing plates. However, such a variatuon of linear polarization is accomplished under limited and evasive conditions relative, in particular, to retardation and the twist angle as well as the angle, $\theta$. As a result from the study and experimentation of these conditions, I have discovered that these conditions of the liquid crystal cell can be optimized by allowing the incident light from the liquid crystal cell and passed to the reflection surface to be linearly polarized. This is explained in greater detail later relative to FIGS. 4 and 5.

In the preferred embodiments, the liquid crystal device of this invention may be provided with a twist angle in the range of 0°-70°, retardation, Δnd, in the range of 0.2 μm-0.7 μm, and an angle, θ, in the range of 35°-115°. More preferably, the twist angle is in the range of 30°-70°, Δnd is in the range of 0.25 μm-0.64 μm, and θ is in the range of 58°-111°. Also, a liquid crystal cell of this invention may be provided with a twist angle in the range of 170°-270°, and Δnd in the range of 0.4 μm-1.0 μm. More preferably, the twist angle is in the range of 175°-210° degrees, Δnd is in the range of 0.51 μm-0.75 μm and the angle θ is in the range of 42°-71°, or, further, the twist angle is in the range of 250°-265°, Δnd is in the range of 0.55 μm-0.96 μm and θ is in the range of −2°-30° degrees. The basis for the foregoing numerical value limitations are explained in greater detail later relative to various figures herein.

As an additional feature and embodiment, at least one of the substrates of the liquid crystal cell may be provided with a surface, relative to the liquid crystal side thereof, having a surface irregularity, i.e., a light scattering surface, forming a surface roughness wherein the height of the surface roughness is the range of 0.1 μm-2 μm. This surface roughness provides for diffusion or scattering of the light reflected from the reflector of the liquid crystal device. More specifically, a reflecting plate or film may be disposed on the interior of the liquid crystal cell transparent substrate and function as the counterelectrode for the liquid crystal display device as well as a diffusion reflector. By providing this light scattering surface at the point of reflection of the light back to the liquid crystal cell, the phenomenon of different coloring effect in the display is further reduced or resolved. This is because the coloring effect is averaged by a variation of thickness, d, of the liquid crystal layer which averaging is effectively introduced by diffusing the reflected light. In particular, when a reflector having light scattering surface is provided at the central phase position of the liquid crystal cell, which in the reflective type mode is at the reflecting surface of the reflector, the problem of double vision or imaging in the display can be materially reduced, if not substantially eliminated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a partially exploded cross sectional view of a liquid crystal display device of one embodiment of this invention.

FIG. 1A is a partially exploded cross sectional view of a liquid crystal display device of another embodiment of this invention and relates, in particular, to Examples 1-3, Examples 5-19 and comparative experimental results, identified as Comparative Experiments 1-3.

FIG. 2 is a partially exploded cross sectional view of a liquid crystal display device of another embodiment of this invention and relates, in particular, to Example 4.

FIG. 3 is a graphic illustration of the relationship among the twist angle, polarizing axis, and upper substrate rubbing direction relative to the liquid crystal display devices of FIGS. 1 and 2.

FIG. 4A is a diagrammatic exploded perspective view illustrating the liquid crystal molecular orientation through a liquid crystal display device of the reflective type.

FIG. 4B is a diagrammatic exploded perspective view illustrating the variation relative to the polarized condition of light transmitted through the liquid crystal display device of the reflective type.

FIG. 5A is a diagrammatic exploded perspective view illustrating the liquid crystal molecular orientation of a reflective type liquid crystal display device of this invention.

FIG. 5B is a diagrammatic exploded perspective view illustrating the liquid crystal molecular orientation of a transmissive type liquid crystal display device, which is optically equivalent to FIG. 5A.

FIG. 5C is a diagrammatic exploded perspective view illustrating the liquid crystal molecular orientation of the conventional NTN mode.

FIG. 5D is a diagrammatic exploded perspective view illustrating the liquid crystal molecular orientation of this invention with the consequence of linearly polarized light entering the cell is symmetrically, linearly polarized light on exiting the cell.

FIG. 6 is a graphical illustration illustrating wherein the twist angle and retardation conditions of the liquid crystal cell provide for an optimized contrast ratio.

FIGS. 7A, 7B and 7C are respectively graphical views illustrating three optical characteristics of the liquid crystal cell comprising the contrast ratio, C.R., the luminance reflectance, $Y_{off}$, and the degree of color change, ΔE, achieved under the conditions of optimized contrast ratio.

FIG. 8 is a graphical illustration illustrating the range of twist angle and retardation conditions of the liquid crystal cell wherein the light from the liquid crystal cell becomes substantially linear polarized in the reflecting phase and a high reflection ratio is achieved when the twist angle is 60°.

FIG. 9 is a graphic illustration of the range of twist angle and retardation conditions for the liquid crystal cell of this invention providing acceptable display contrast when the twist angle is 0°.

FIG. 10 is a graphic illustration of the range of twist angle and retardation conditions for the liquid crystal cell of this invention providing acceptable display contrast when the twist angle is 30°.

FIG. 11 is a graphic illustration of the range of twist angle and retardation conditions for the liquid crystal cell of this invention providing acceptable display contrast when the twist angle is 45°.

FIG. 12 is a graphic illustration of the range of twist angle and retardation conditions for the liquid crystal cell of this invention providing acceptable display contrast when the twist angle is 60°.

FIG. 13 is a graphic illustration of the range of twist angle and retardation conditions for the liquid crystal cell of this invention providing acceptable display contrast when the twist angle is 70°.

FIG. 14 is a graphic illustration of the range of twist angle and retardation conditions for the liquid crystal cell of this invention providing acceptable display contrast when the twist angle is 170°.

FIG. 15 is a graphic illustration of the range of twist angle and retardation conditions for the liquid crystal cell of this invention providing acceptable display contrast when the twist angle is 175°.

FIG. 16 is a graphic illustration of the range of twist angle and retardation conditions for the liquid crystal cell of this invention providing acceptable display contrast when the twist angle is 180°.

FIG. 17 is a graphic illustration of the range of twist angle and retardation conditions for the liquid crystal cell of this invention providing acceptable display contrast when the twist angle is 200°.

FIG. 18 is a graphic illustration of the range of twist angle and retardation conditions for the liquid crystal cell of this invention providing acceptable display contrast when the twist angle is 210°.

FIG. 19 is a graphic illustration of the range of twist angle and retardation conditions for the liquid crystal cell of this invention providing acceptable display contrast when the twist angle is 250°.

FIG. 20 is a graphic illustration of the range of twist angle and retardation conditions for the liquid crystal cell of this invention providing acceptable display contrast when the twist angle is 255°.

FIG. 21 is a graphic illustration of the range of twist angle and retardation conditions for the liquid crystal cell of this invention providing acceptable display contrast when the twist angle is 260°.

FIG. 22 is a graphic illustration of the range of twist angle and retardation conditions for the liquid crystal cell of this invention providing acceptable display contrast when the twist angle is 265°.

FIG. 23 is a graphic illustration of the range of twist angle and retardation conditions for the liquid crystal cell of this invention providing acceptable display contrast when the twist angle is 270°.

FIG. 24 is a graphic illustration of the spectral characteristics of the liquid crystal display device in connection with Example 1 of this invention when the electric field is turned OFF and when the electric field is turned ON.

FIG. 25 is a graphic illustration of the spectral characteristics of the liquid crystal display device in connection with Example 2 of this invention when the electric field is turned OFF and when the electric field is turned ON.

FIG. 26 is a graphic illustration of the spectral characteristics of the liquid crystal display device in connection with Example 3 of this invention when the electric field is turned OFF and when the electric field is turned ON.

FIG. 27 is a side view of a conventional liquid crystal display device known in the art.

FIG. 28 is a graphic illustration of the spectral characteristics of the conventional liquid crystal display device shown in FIG. 27 when the electric field is turned OFF and when the electric field is turned ON.

DESCRIPTION OF THE PREFERRED EMBODIMENTS

Reference is now made to FIG. 4 for the purpose of explaining the principles of operation of this invention. FIG. 4A shows a liquid crystal display device having a single polarizing plate or polarizer 2 and a liquid crystal cell comprising upper transparent substrate 11 and reflecting plate or reflector 4 between which is shown the orientation of liquid crystal molecules 16. Polarizer 2 provides for linear polarization of the incident light entering the cell from the left side thereof, as seen in FIG. 4B. FIG. 4B shows the transformation in polarization of the linearly polarized light wherein the light passing through the cell which is continually changed in elliptic polarization caused by the phase difference due to the retardation of liquid crystal molecules 16. If the condition of linear polarization is as indicated at plate 2 in FIG. 4B, and the incident light is reflected by plate 4 and returned to its original condition of linear polarization by passing through the same polarization transformation in the return path as experienced in the original path of incident light so that there would be no substantial loss experienced in the level of luminance. This condition can be further explained in connection with FIG. 5.

The reflective type liquid crystal mode of the present invention is illustrated in FIG. 5A and is optically equivalent to the transmission type liquid crystal mode illustrated in FIG. 5B wherein two polarizing plates 11 are utilized. In FIG. 5B, liquid crystal molecules 16 and polarizing plates 11 are arranged to be symmetric relative to the centrally located peak change in phase, which is indicated at plane 17. This position in FIG. 5B is optically equivalent to the position reflector 4 in FIG. 5A. It is known in the art that when a pair of polarization plates having equivalent retardation are superposed one on another so that their respective orthogonal fast and slow optical axes are overlapped such that the fast axis and the slow axis of one plate is respectively parallel to the slow axis and the fast axis of the other plate, optical compensation relative to the phase difference existing between the fast and slow axis will be achieved for light passing through both plates. It is proposed in the Japanese Patent Official Gazette No. 64-519, relative to the new twisted nematic (NTN) mode, that such a principle be employed in a liquid crystal display device. The NTN mode is provided by utilizing two superposed liquid crystal cells each having equivalent retardation and reversed twist angle directions. FIG. 5C illustrates the molecule arrangement of a liquid crystal cell arrangement of this nature wherein the pair of liquid crystal molecules 16 at the position of central symmetry at plane 17 are orthogonal relative to each other in the liquid crystal material. This crossed orthogonal relationship is compensated by the above mentioned principle.

In view of the forgoing, it is necessary in the reflective type liquid crystal display device that the liquid crystal molecular arrangement illustrated in FIG. 5B function in a manner similar to that shown for the liquid crystal molecular arrangement illustrated in FIG. 5C in order to provide for the linear polarization for reflected light returning through the liquid crystal cell to have the same or substantially the same condition of linear polarization as it has when entering the liquid crystal cell. I have discovered that this condition can be satisfied when the transmitted light has undergone linear polarization at the central phase at plane 17 of the liquid crystal layer. This condition can be confirmed upon the basis that no variation in optical characteristics occurs even if the pair of polarizing plates 11 are rotated in 90°. This condition in the case of a single polarizer liquid crystal display is illustrated in FIG. 5D wherein the cell is in the OFF state or condition and enhanced brightness is achieved in the display. Incident polarized light 28 has a perpendicular polarizing plane via polarizer 2 and proceeds through the cell to reflector 4 wherein the light at this central phase position, equivalent to plane 17, has undergone linear polarization via the liquid crystal directors 16 and is linearly polarized light at position 24 on reflector 4. Reflected linearly polarized light 26 then returns via polarizer 2 basically with identical linear polarization, as shown in FIG. 5D. In the illustration of FIG. 5D, the twist angle may be 60° and the angle of polarized light 24 at reflector 24 is about 60°.

Thus, in the case of the OFF state wherein the light entered from the liquid crystal cell to the reflecting phase at reflector 4 becomes substantially linearly polarized, the brightness of the display is enhanced. Such a condition, however, has no relationship relative to contrast when the display is in the ON state, wherein a darkened condition is required as well as the foregoing mentioned, enhanced brightness. For example, the condition of the cell, wherein the light from the liquid crystal cell entering into the reflecting phase during the OFF state becomes substantially linear polarized in the case where the twist angle is 60°, as illustrated in FIG. 5D, are the regions indicated by cross hatch in FIG. 8. Moreover, in FIG. 12, there is also shown the condition of the cell wherein a satisfactory contrast can be achieved in the case where the twist angle is 60°. The horizontal axis designates retardation, $\Delta nd$, and the vertical axis designates the angle, $\theta$, which is formed by the polarizing axis direction of the single polarizer with the orientation direction of the liquid crystal layer being relative to the upper orientation film rubbing direction 22. Regions designated by circles 51, 52 and 53 designate regions in which the contrast ratio, C.R., of more than 1:20, 1:10 and 1:5 are respectively achieved. In other words, the display during the OFF state becomes darker within regions 51–53 so that a higher contrast is achieved. Since these same results are achieved if the angle $\theta$ is added for integer values of 90°, it can be considered from a practical standpoint that the angle of 0° is formed in series with the angle of 90° in FIGS. 8 and 12.

From FIG. 12, it can be seen that the contrast ratio becomes the maximum when the retardation, $\Delta nd$, is approximately 0.46 $\mu m$ and the angle, $\theta$, is about 4 degrees under the condition wherein the twist angle is 60°, and the condition of the liquid crystal cell wherein sufficient contrast ratio can be achieved is limited to one side of the display panel or cell.

Therefore, it can be seen that the condition in which the light enters from the liquid crystal cell into the reflecting phase at plane 17 at reflector 4 becomes substantially linearly polarized is a necessary condition for enhanced brightness to be achieved in the OFF state for a reflective type, liquid crystal display of the optical anisotropic type. Similarly, the condition of the cell in which maximized contrast ratio in the ON state is achieved for twist angles in the range of 0°–270° is illustrated in FIG. 6.

FIG. 7 shows the optical characteristics of the liquid crystal cell obtained relative to each of the twist angle conditions illustrated in FIG. 6. The horizontal axis in FIG. 7 is the twist angle of liquid crystal and the vertical axis is the contrast ratio, C.R., (FIG. 7A); the luminance reflectance or brightness, $Y_{off}$, when the display is turned OFF (FIG. 7B); and the degree of color change, $\Delta E$, as viewed from the front position of the device (FIG. 7C). Contrast, C.R., is the ratio of reflectance during the OFF state ($Y_{off}$) to reflectance during the ON state ($Y_{on}$). Brightness represents the reflectance during the OFF state and is expressed as $Y_{off}(\%)$ equal to $R_{off}/R_o \times 100$, where $R_{off}$ is the amount of reflected light from the combination comprising the polarizer, liquid crystal cell and reflecting plate or film and $R_o$ is the amount of reflected light from the combination comprising the polarizer and reflecting plate or film. However, 100% brightness for $Y_{off}$ is not obtainable because of loses at the reflecting surface of the reflecting plate or film, so that brightness up to around 80% or more is generally achieved and is regarded as very good. $\Delta E$ can be defined by the square root of $a^{*2} + b^{*2}$ wherein $a^*$ and $b^*$ are defined in the CIE1976-L*A*B* color table. As the value of $\Delta E$ becomes smaller, the degree of different color effects present in the display becomes decreasing less pronounced. From an examination of FIG. 7, it can be seen that the twist angle should be either in the range of 0°–70° or in the range of 170°–265° to achieve a contrast ratio which is greater than 1:10 to provide a high quality image display. When the twist angle is in the range of 265°–270°, the contrast ratio is lower, i.e., about 1:6. However, its electric optical characteristics are sufficient to form a large capacity display and, therefore, such a twist angle range can provide an acceptable level for use in a liquid crystal display. In particular, in the case where the twist angle is in the range of 30°–70°, or in the range of 175°–210°, or in the range of 250°–265°, a more efficient and acceptable display can be achieved because the different coloring effect present in the display is materially reduced, if not resolved.

From the forgoing, it can be seen that FIG. 6 illustrates the conditions for maximum contrast that can be obtained within the limits of retardation, $\Delta nd$, twist angle and angle, $\theta$. In this connection, FIGS. 9–23 illustrate the conditions for a liquid crystal cell having acceptable contrast ratio for different ranges of twist angles and retardation. In FIGS. 9–23, contrast regions 51, 52 and 53 are respectively for the contrast ratios of 1:20, 1:10 and 1:5. Inner region 51 may be referred to as the region of maximum contrast and regions 52 and 53 may be referred to as peripheral regions of improved contrast. In the present state of the art, the presumption is that an acceptable contrast ratio is one that is desired to be greater than 1:5 for a standard level liquid crystal image display and is desired to be greater than 1:10 for a high quality liquid crystal image display.

In FIG. 1 there is shown a liquid crystal display device 10 comprising a first embodiment of this invention. Device 10 is similar to device 1 of FIG. 27 except that device 10 is provided with only one polarizer 2 and has a reflector 4 at the in phase position relative to liquid crystal cell 10A, as previously explained in connection with FIGS. 4 and 5. Device 10 comprises liquid crystal cell 10A having an upper transparent substrate 11 and a lower transparent substrate 12 spatially separated by means of spacer 20 forming an interior region for optically anisotropic liquid crystal material 15. A first transparent electrode 13 is disposed on the interior surface of upper substrate 11 and a second transparent electrode 16 is disposed on the interior surface of lower substrate 12. First and second electrodes 13 and 16 may be patterned as parallel interdigital electrodes as is known in the art. Upper orientation film 18 is disposed on the interior surface of electrode 13 and lower orientation film 19 is disposed on the interior surface of electrode 16. Device 10 includes single polarizer 2 disposed relative to upper substrate 11 and a reflector 4 disposed relative to lower substrate 12. Metal materials providing a silver-white color, such as, a nickel-chrome metal layer, are very suitable. Also, metal oxides or hydroxides that provide a diffusion quality may also be utilized. Further, the light scattering roughness treatment of surface can be accomplished by mechanical abrasive polishing or by chemical treatment, such as, with a fine etching solution.

FIG. 3 illustrates the relationship of various axis relative to directions of polarization, rubbing and twist angle for the liquid crystal display device 10 as viewed from an observed direction. Arrow 21 is the polarizing or absorbing axis direction for polarizer 2. Arrow 22 is the rubbing direction relative to upper orientation film 18. The twist angle is indicated by arrow 32, which is formed relative to arrows 22 and 23, wherein the twist direction of liquid crystal 15 is positive. Arrow 31 is the angle, $\theta$, which is the angle formed by the polarizing axis direction 21 of single polarizer 2 from the axis of the orientation direction of the liquid crystal layer relative to the upper rubbing direction 22, i.e., the angle 31 formed from axis 22 in a counterclockwise direction to axis 21.

Reference is now made to several examples relating to the liquid crystal display device of this invention with reference to the embodiments shown in FIGS. 2 and 3. These examples are intended purely for the purpose of illustration of the forgoing principles of operation and not to be construed as defining specific limitations of the invention, whereas such limitations are defined by the claims herein and not by the following examples.

EXAMPLE 1

In FIG. 1A there is shown a liquid crystal display device 10" comprising this invention. Device 10" is similar to device 10 of FIG. 1 except that device 10" includes a light scattering or diffused surface 4A. Device 10" comprises liquid crystal cell 10A having an upper transparent substrate 11 and a lower transparent substrate 12 spatially separated by means of spacer 20 forming an interior region for optically anisotropic liquid crystal material 15. A first transparent electrode 13 is disposed on the interior surface of upper substrate 11 and a second transparent electrode 16 is disposed on the interior surface of lower substrate 12. Upper orientation film 18 is disposed on the interior surface of electrode 13 and lower orientation film 19 is disposed on the interior surface of electrode 16. Device 10" includes single polarizer 2 disposed relative to upper substrate 11 and a reflector 4 disposed relative to lower substrate 12. In this embodiment, reflector 4 is provided with a light scattering surface 4A, discussed later in greater detail in connection with FIG. 2 relative to reflector surface 14A of FIG. 2. Reflector 4 may be of any high reflecting surface material, such as Al, Ti, W, Ni or Cr or alloys of such metal films. Metal materials providing a silver-white color, such as, a nickel-chrome metal layer, are very suitable. Also, metal oxides or hydroxides that provide a diffusion quality may also be utilized. Further, the light scattering roughness treatment of surface can be accomplished by mechanical abrasive polishing or by chemical treatment, such as, with a fine etching solution. Further, in this particular example, liquid crystal material 15 employed was product no. ZLI-4472 ($\Delta n=0.0871$), a product of the Merck Corporation, and had a twist oriented relative to liquid crystal cell 10A. The cell thickness was 5.3 $\mu$m and the retardation, $\Delta nd$, was 0.46 $\mu$m.

FIG. 3 illustrates the relationship of various axis relative to directions of polarization, rubbing and twist angle for the liquid crystal display device 10" as viewed from an observed direction. Arrow 21 is the polarizing or absorbing axis direction for polarizer 2. Arrow 22 is the rubbing direction relative to upper orientation film 18. The twist angle is indicated by arrow 32, which is formed relative to arrows 22 and 23, wherein the twist direction of liquid crystal 15 is positive. Arrow 31 is the angle, $\theta$, which is the angle formed by the polarizing axis direction 21 of single polarizer 2 with the orientation direction of the liquid crystal layer relative to the upper rubbing direction 22, i.e., the angle formed between arrows 21 and 22. In the example here, angle, $\theta$, at 31 was set at 4° and the twist angle 32 is set at 60° counterclockwise relative to rubbing direction 22.

FIG. 24 illustrates the spectral characteristics of the liquid crystal display device 10". The spectral characteristics when the electric field is turned OFF is indicated by curve 41, and the spectral characteristics when the electric field is turned ON is indicated by curve 42. The luminance reflectance, $Y_{off}$, during OFF condition was relatively high, about 81%, and the display color was approximately white. The luminance reflectance during ON condition was relatively low, about 2.4%, the maximum possible contrast ratio, C.R., was about 1:34.

As previously indicated, the twist angle of liquid crystal display device 10" was 60°, and its voltage transmission factor property is similar to that of the conventional twisted nematic (TN) mode. Device 10" may be driven by conventional X-Y matrix multiplex controller with a multiplex driving voltage having a duty cycle ratio in the range of 1/2 through 1/16.

FIG. 12 illustrates the range of twist angle and retardation conditions for cell 10A wherein acceptable display contrast can be achieved when the twist angle is 60°, which is the case for Example 1. The respective contrast regions 51, 52 and 53 are respectively for contrast ratios 1:20, 1:10 and 1:5. The same exact results are achieved for integer values of angle, $\theta$, plus 90°. For example, the case for $\theta$ equal to $-10°$ is substantially the same as the case where $\theta$ is equal to 80° or when $\theta$ is equal to 170° and so on.

An acceptable display image can be expected within the inner region of contrast regions 51-53. Examples of acceptable brightness contrast in FIG. 12 is when $\Delta nd$ is 0.60 $\mu$m and $\theta$ is 16°, C.R. is 1:16 and $Y_{off}$ is 80%, or when $\Delta nd$ is 0.34 $\mu$m and $\theta$ is $-6°$, C.R. is 1:10 and $Y_{off}$ is 71%. Further, or when $\Delta nd$ is 0.48 $\mu$m and $\theta$ is $-6°$, C.R. is 1:6 and $Y_{off}$ is 84%. An acceptable display image cannot be expected outside the ambient of regions, 51-53. Examples of unacceptable brightness contrast in FIG. 12 is when $\Delta nd$ is 0.28 $\mu$m and $\theta$ is $-12°$, C.R. is 1:3 and $Y_{off}$ is 62%, or when $\Delta nd$ is 0.72 $\mu$m and $\theta$ is 4°, C.R. is 1:2 and $Y_{off}$ is 76%, or when $\Delta nd$ is 0.40 $\mu$m and $\theta$ is 30°, C.R. is 1:0.4 and $Y_{off}$ is 24%. Therefore, it is necessary that the value of $\Delta nd$ be at least in the range of 0.3 $\mu$m–0.7 $\mu$m, and the twist angle be in the range of $-13°$ to 25° when the twist angle is about 60°.

EXAMPLE 2

The liquid crystal display device of Example 2 is structured the same as liquid crystal display device 10" of Example 1. However, liquid crystal cell 10A was, instead, provided with liquid crystal product no. ZLI-4436 ($\Delta n=0.1100$) for liquid crystal material 15, which is a product of the Merck Corporation. The cell gap or thickness was 5.4 $\mu$m, and the retardation, $\Delta nd$, was 0.59 $\mu$m. The angle, $\theta$, arrow 31, was set at 60° and the twist angle 32 is set at 200° counterclockwise from rubbing direction 22.

FIG. 25 illustrates the spectral characteristics of the liquid crystal display device 10" for Example 2. The spectral characteristics when the electric field is turned OFF is indicated by curve 41, and the spectral characteristics when the electric field is turned ON is indicated by curve 42. The luminance reflectance or brightness, $Y_{off}$, during OFF condition was relatively high, about 70%, and the display color was approximately white. The brightness during ON condition was relatively low, about 3.3%, the maximum possible contrast ratio, C.R., was about 1:21.

In particular, liquid crystal display device 10″ of Example 2 was remarkably different from liquid crystal display device 10″ of Example 1 in that the twist angle 32 was significantly larger and, therefore, is well suited case for being multiplex driven with a higher duty ratio. This is because the higher twist angle provides for a steeper or more definitive threshold value of electro-optical characteristics.

FIG. 17 illustrates the range of twist angle and retardation conditions for cell 10A of Example 2 wherein acceptable display brightness contrast can be achieved for a twist angle in the region of the twist angle of Example 2, i.e., about 200°. An acceptable display image can be expected within the inner region of contrast regions 51-53, for example, when $\Delta nd$ is 0.66 μm and $\theta$ is 64°, C.R. is 1:11 and $Y_{off}$ is 75%., or when $\Delta nd$ is 0.58 μm and $\theta$ is 52°, C.R. is 1:8 and $Y_{off}$ is 77%. An acceptable display image cannot be expected outside of regions, 51-53, for example, when $\Delta nd$ is 0.70 μm and $\theta$ is 46°, C.R. is 1:2 and $Y_{off}$ is 62%, or when $\Delta nd$ is 0.5 μm and $\theta$ is 90°, C.R. is 1:0.3 and $Y_{off}$ is 19%. Therefore, it is necessary that the value of $\Delta nd$ be at least in the range of 0.48 μm–0.72 μm, and the angle, $\theta$, be in the range of 48°–70° when the twist angle is about 200°.

EXAMPLE 3

The liquid crystal display device of Example 3 is structured the same as liquid crystal display device 10″ of Example 1. However, liquid crystal cell 10A in FIG. 1 was, instead, provided with liquid crystal product no. ZLI-4427 ($\Delta n = 0.1127$) for liquid crystal material 15, which is a product of the Merck Corporation. The cell gap or thickness was 6.6 μm, and the retardation, $\Delta nd$, was 0.74 μm. Also, in Example 3, polyimide RN-721, which is a product of Nissan Chemical Industry Corporation with a high pre-tilt angle for use when the twist angle is equal to or greater than 240°, was employed for orientation films 18 and 19, and liquid crystal 15 was provided with the pre-tilt angle of about 10° by means of the rotary rubbing of films 18 and 19 with a rayon flocked blanket. The angle $\theta$, arrow 31, was set at 14° and twist angle 32 was set at 255° counterclockwise from rubbing direction 22.

FIG. 26 illustrates the spectral characteristics of the liquid crystal display device 10″ for Example 3. The spectral characteristics when the electric field is turned OFF is indicated by curve 41, and the spectral characteristics when the electric field is turned ON is indicated by curve 42. The luminance reflectance, $Y_{off}$, during OFF condition was relatively high, about 79%, and the display color was approximately white. The luminance reflectance during ON condition was relatively low, about 3.2%, the maximum possible contrast ratio, C.R., was about 1:25.

In particular, liquid crystal display device 10″ of Example 3 was remarkably different from liquid crystal display device 10″ of Example 1 in that the twist angle is relative large, i.e., 255° and, therefore, a high contrast of 1:18 can be achieved under multiplex driven conditions utilizing a duty cycle ratio of 1/480.

FIG. 20 illustrates the range of twist angle and retardation conditions for cell 10A of Example 3 wherein acceptable display brightness contrast can be achieved when the twist angle is similar to that for Example 3, i.e., about 255°. An acceptable display image can be expected within the inner region of contrast regions 51-53, for example, when $\Delta nd$ is 0.70 μm and $\theta$ is 5°, C.R. is 1:11 and $Y_{off}$ is 78%, or when $\Delta nd$ is 0.90 μm and $\theta$ is 28°, C.R. is 1:9 and $Y_{off}$ is 71%. An acceptable display image cannot be expected outside of regions, 51-53, for example, when $\Delta nd$ is 0.50 μm and $\theta$ is 55°, C.R. is 1:1 and $Y_{off}$ is 81%, or when $\Delta nd$ is 1.1 μm and $\theta$ is 30°, C.R. is 1:3 and $Y_{off}$ is 63%. Therefore, it is necessary that the value of $\Delta nd$ be at least in the range of 0.52 μm–0.98 μm, and the angle, $\theta$, be in the range of −4° to 32° when the twist angle is about 255°.

Another alternative relative to the embodiment shown in FIG. 1 is the substitution of reflector 4 for lower electrode 16 so that reflector 4 functions not only as a reflector at the central phase position but also doubles or functions as the lower electrode for cell 10A. In such a case, reflector 4 may be a deposited planar reflecting film. Since the thickness of lower substrate 12 is not involved, there is no formation of a shadow double image of the displayed image to interfere with the display of the latter.

Reference is now made to another embodiment of this invention which is shown in FIG. 2 and exemplified in the following Example 4. In FIG. 2, device 10′ is similar to device 10 of FIG. 1 except that device 10′ is provided with a reflector 14 on the upper surface of lower substrate 12 and, further, its surface 14A is provided with a roughness texture to bring about light scattering or diffusion to reflected light from its surface. Device 10′ comprises liquid crystal cell 10B having an upper transparent substrate 11 and a lower transparent substrate 12 spatially separated by means of spacer 20 forming an interior region for optically anisotropic liquid crystal material 15. A first transparent electrode 13 is disposed on the interior surface of upper substrate 11 and reflection plate 14 may be formed as a deposited film on the interior surface of lower substrate 12. Reflection film 14 also doubles or functions as the lower electrode in this embodiment. Also, film 14 is provided with a roughness texture 14A on it surface for the purpose of scattering or diffusing reflected light. Upper orientation film 18 is disposed on the interior surface of electrode 13 and lower orientation film 19 is disposed on the surface of film 14. Device 10′ includes single polarizer 2 disposed relative to upper substrate 11.

While the foregoing Examples 1-3 reduce the different coloring or multi-coloring effect in the display device 10, the multi-coloring effect can be even further reduced, if not fully resolved, by providing light scattering or roughness texture 14A on the surface of reflecting film 14. The position of film 14A is equivalent position of central phase region 17 illustrated in FIG. 5C. This reduction in the coloring effect is brought about by the scattered light which is averaged by the variation of thickness of the liquid crystal layer. In particular, when a diffusion reflector means 14 is provided at a central phase point for liquid crystal cell 10B to have light scattering roughness or diffusion properties on its surface 14A, the problem of double vision or imaging in the display can be resolved. However, when the light scattering roughness is less than about 0.1 μm, the effect of reducing the effect of multi-coloring effect in the display cannot be readily achieved and, further, the reflecting film 14 functions more as a phase mirror without scattering or diffusion properties. On the other hand, when the light scattering roughness exceeds about 2 μm, the effect of multi-coloring effect in the display becomes greater and, as a result, the contrast ratio is significantly degraded. This can be readily understood from FIG. 12 when considering the retardation, $\Delta nd$, which is 0.16 μm, produced by a standard liquid crystal having $\Delta n$ of 0.08.

EXAMPLE 4

This example relates to the structure show in FIG. 2. However, the conditions for cell 10B where made to be is substantially the same as the conditions for cell 10A for Example 1 in that liquid crystal 15 is product no. ZLI-4472 ($\Delta n = 0.0871$) so that the average retardation, $\Delta nd$ was 0.46 μm and, further, the twist angle was set to 60° and the angle $\theta$ was 4°. Reflecting film 14 is provided with a light scattering or diffusion surface 14A formed by the sputtered deposition of an aluminum thin film on a ground glass surface comprising transparent substrate 12. The light scattering roughness of surface 14A was in the range of 0.5 μm so that the reflected light from surface 14A will be significantly scattered, compared to a planar reflecting surface in the case of FIG. 5D.

Reflector 14 may be of any high reflecting surface material, such as Al, Ti, W, Ni or Cr or alloys of such metal films. Metal materials providing a silver-white color, such as, a nickel-chrome metal layer, are very suitable. Also, metal oxides or hydroxides that provide a diffusion quality may also be utilized. Further, the light scattering roughness treatment of surface 14A can be accomplished by mechanical abrasive polishing or by chemical treatment, such as, with a fine etching solution.

Patterning for forming a series of parallel interdigital electrodes at reflector 14 may be accomplished by either, (1) direct pattering a thin metal film deposited on a glass substrate 12 to form a series of elongated, interdigital electrodes employing convention etching techniques or (2) by patterning a transparent electrode formed on an insulating film overlying a thin metal film to form a series of elongated, interdigital transparent electrodes employing convention etching techniques. Since the insulating film per se is effective to induce light scattering, it is suited in this case to employ the latter method of patterning where the twist angle is large and the d/p margin is small. In the case of patterning by method (1) the patterned interdigital electrodes are employed as the reflector. There is no reflector in the spacing between the formed interdigital electrodes so the this spacing has the apperance of black. A mask is provided in the interdigital spacing so that light scattering is achieved at these spacings which is effective to improve the contrast ratio.

Furthermore, since reflecting film 14 is actually within the confines of liquid crystal cell 10B, to substantially resolve the problem of double image, the differentiation in coloration or the multi-coloring effect across the display is also reduced by means of diffuser 14 in combination with a variation introduced in the liquid crystal layer thickness, d, across cell 10B, which causes an averaging across the extent of the display of the coloring effect. A variation in the liquid crystal layer thickness, d, in the range of 0.5 μm corresponds to the value of $\Delta nd$ in the range of 0.04 μm. This slight variation in thickness, d, can be brought about by the roughened cell surface 14A. The color effect of the displayed image changes in accordance with changes in the thickness of liquid crystal layer 15. A substantially monochromatic black and white image is achieved by color averaging caused by the series of high and low points formed in surface 14A so that there exists a continuous layer thickness variation throughout the cell, which is not visually observable with the ordinary human eye but achieves color averaging.

As can be seen from the results in FIG. 12, the contrast ratio is also not affected by such a liquid crystal layer thickness variation. Thus, in the case of Example 4 wherein the liquid crystal layer thickness, d, varies about the value of 0.5 μm (e.g., from 0.3 μm to 0.8 μm), the value of $\Delta nd$ will vary within a range between 0.4 μm and 0.5 μm so that, in spite of this variation, the contrast ratio remains in the range of 1:20. Thus, even through a variation in liquid crystal thickness generally can cause a reduction in contrast ratio, the contrast ratio is not so affected in the case of this invention.

EXAMPLE 5

Relative to this example, the conditions for the display device 10" were established to be substantially the same as the case for Example 1, except that the twist angle was set at 0°, $\Delta nd$ was 0.28 μm and $\theta$ was 44°. The C.R. was 1:27 and $Y_{off}$ was 76%. Since the twist angle of liquid crystal display device 10" of this example is 0°, the manufacturing of such a display is simpler since the rubbing directions 22 and 23 are oriented in the same direction. FIG. 9 illustrates the range of twist angle and retardation conditions for cell 10A wherein acceptable display contrast can be achieved when the twist angle is 0°. In this particular case, it is necessary in order to achieve an acceptable display to set the value of $\Delta nd$ in the range of 0.22 μm–0.32 μm and $\theta$ in the range of 34°–55°.

EXAMPLE 6

Relative to this example, the conditions for the display device 10" were established to the substantially the same as the case for Example 1, except that the twist angle was set at 30°, $\Delta nd$ was 0.30 μm and $\theta$ was 66°. The C.R. was 1:32 and $Y_{off}$ was 78%. FIG. 10 illustrates the range of twist angle and retardation conditions for cell 10A wherein acceptable display contrast can be achieved when the twist angle is 30°. In this particular case, it is necessary in order to achieve an acceptable display to set the value of $\Delta nd$ in the range of at least 0.22 μm–0.39 μm and $\theta$ in the range of 55°–77°.

EXAMPLE 7

Relative to this example, the conditions for the display device 10" were established to the substantially the same as the case for Example 1, except that the twist angle was set at 45°, $\Delta nd$ was 0.34 μm and $\theta$ was 76°. The C.R. was 1:34 and $Y_{off}$ was 80%. FIG. 11 illustrates the range of twist angle and retardation conditions for cell 10A wherein acceptable display contrast can be achieved when the twist angle is 45°. In this particular case, it is necessary in order to achieve an acceptable display to set the value of $\Delta nd$ in the range of 0.25 μm–0.50 μm and $\theta$ in the range of 64°–94°.

EXAMPLE 8

Relative to this example, the conditions for the display device 10" were established to the substantially the same as the case for Example 1, except that the twist angle was set at 70°, $\Delta nd$ was 0.48 μm and $\theta$ was 8°. The C.R. was 1:10 and $Y_{off}$ was 81%. FIG. 13 illustrates the range of twist angle and retardation conditions for cell 10A wherein acceptable display contrast can be achieved when the twist angle is 70°. In this particular case, it is necessary in order to achieve an acceptable display to set the value of Δnd in the range of 0.36 μm–0.61 μm and θ in the range of −6° to 21°.

EXAMPLE 9

Relative to this example, the conditions for the display device 10″ were established to the substantially the same as the case for Example 2, except that the twist angle was set at 170°, Δnd was 0.72 μm and θ was 46°. The C.R. was 1:13 and $Y_{off}$ was 67%. FIG. 14 illustrates the range of twist angle and retardation conditions for cell 10A wherein acceptable display contrast can be achieved when the twist angle is 170°. In this particular case, it is necessary in order to achieve an acceptable display to set the value of Δnd in the range of 0.60 μm–0.82 μm and θ in the range of 37°–55°.

EXAMPLE 10

Relative to this example, the conditions for the display device 10″ were established to the substantially the same as the case for Example 2, except that the twist angle was set at 175°, Δnd was 0.70 μm and θ was 48°. The C.R. was 1:16 and $Y_{off}$ was 71%. FIG. 15 illustrates the range of twist angle and retardation conditions for cell 10A wherein acceptable display contrast can be achieved when the twist angle is 175°. In this particular case, it is necessary in order to achieve an acceptable display to set the value of Δnd in the range of 0.58 μm–0.81 μm and θ in the range of 37°–57°.

EXAMPLE 11

Relative to this example, the conditions for the display device 10″ were established to the substantially the same as the case for Example 2, except that the twist angle was set at 180°, Δnd was 0.68 μm and θ was 50°. The C.R. was 1:18 and $Y_{off}$ was 74%. FIG. 16 illustrates the range of twist angle and retardation conditions for cell 10A wherein acceptable display contrast can be achieved when the twist angle is 180°. In this particular case, it is necessary in order to achieve an acceptable display to set the value of Δnd in the range of 0.55 μm–0.79 μm and θ in the range of 40°–60°. The liquid crystal display device 10″ of this example is particularly superior to the liquid crystal display device 10″ of Example 2 in that a more enhanced reduction in color differentiation appearance or effect across the display image was achieved.

EXAMPLE 12

Relative to this example, the conditions for the display device 10″ were established to the substantially the same as the case for Example 2, except that the twist angle was set at 190°, Δnd was 0.62 μm and θ was 54°. The C.R. was 1:21 and $Y_{off}$ was 74%.

EXAMPLE 13

Relative to this example, the conditions for the display device 10″ were established to the substantially the same as the case for Example 2, except that the twist angle was set at 210°, Δnd was 0.58 μm and θ was 66°. The C.R. was 1:20 and $Y_{off}$ was 64%. FIG. 18 illustrates the range of twist angle and retardation conditions for cell 10A wherein acceptable display contrast can be achieved when the twist angle is 210°. In this particular case, it is necessary in order to achieve an acceptable display to set the value of Δnd in the range of 0.46 μm–0.71 μm and θ in the range of 54°–76°.

EXAMPLE 14

Relative to this example, the conditions for the display device 10″ were established to the substantially the same as the case for Example 2, except that the twist angle was set at 225°, Δnd was 0.56 μm and θ was 76°. The C.R. was 1:20 and $Y_{off}$ was 54%.

EXAMPLE 15

In the case of Example 3 above, the conditions for the display device 10″ were established to the substantially the same as the case for Example 2, except that the twist angle was set at 240°, Δnd was 0.62 μm and θ was −2°. The C.R. was 1:23 and $Y_{off}$ was 62%.

EXAMPLE 16

Relative to this example, the conditions for the display device 10″ were established to the substantially the same as the case for Example 3, except that the twist angle was set at 250°, Δnd was 0.70 μm and θ was 8°. The C.R. was 1:27 and $Y_{off}$ was 74%. FIG. 19 illustrates the range of twist angle and retardation conditions for cell 10A wherein acceptable display contrast can be achieved when the twist angle is 250°. In this particular case, it is necessary in order to achieve an acceptable display to set the value of Δnd in the range of 0.51 μm–1.05 μm and θ in the range of −7° to 35°.

EXAMPLE 17

Relative to this example, the conditions for the display device 10″ were established to the substantially the same as the case for Example 3, except that the twist angle was set at 260°, Δnd was 0.74 μm and θ was 16°. The C.R. was 1:16 and $Y_{off}$ was 80%. FIG. 21 illustrates the range of twist angle and retardation conditions for cell 10A wherein acceptable display contrast can be achieved when the twist angle is 260°. In this particular case, it is necessary in order to achieve an acceptable display to set the value of Δnd in the range of 0.55 μm–0.96 μm and θ in the range of 0°–32°. The liquid crystal display device 10″ of this example is particularly superior to the liquid crystal display device 10″ of Example 3 in that reduced color differentiation appearance or effect across the display image was achieved.

EXAMPLE 18

Relative to this example, the conditions for the display device 10″ were established to the substantially the same as the case for Example 3, except that the twist angle was set at 265°, Δnd was 0.74 μm and θ was 18°. The C.R. was 1:10 and $Y_{off}$ was 81%. FIG. 22 illustrates the range of twist angle and retardation conditions for cell 10A wherein acceptable display contrast can be achieved when the twist angle is 265°. In this particular case, it is necessary in order to achieve an acceptable display to set the value of Δnd in the range of 0.57 μm–0.90 μm and θ in the range of 4°–30°. The liquid crystal display device 10″ of this example is particularly superior to the liquid crystal display device 10″ of Examples 3 and 16 in that a further reduced color differentiation appearance or effect across the display image was achieved, which is supported by FIG. 7C wherein the twist angle of 265° is in the region of materially reduced different coloring effect..

EXAMPLE 19

Relative to this example, the conditions for the display device 10" were established to the substantially the same as the case for Example 3, except that the twist angle was set at 270°, $\Delta$nd was 0.70 μm and $\theta$ was 18°. The C.R. was 1:6 and $Y_{off}$ was 80%. FIG. 23 illustrates the range of twist angle and retardation conditions for cell 10A wherein acceptable display contrast can be achieved when the twist angle is 270°. In this particular case, it is necessary in order to achieve an acceptable display to set the value of $\Delta$nd in the range of 0.64 μm–0.81 μm and $\theta$ in the range of 12°–26°. The liquid crystal display device 10" of this example is particularly superior to the liquid crystal display device 10" of Examples 3, 16 and 17 in that a more enhanced reduction in color differentiation appearance or effect across the display image was achieved, which is supported by FIG. 7C wherein the twist angle of 270° is in the region of materially reduced different coloring effect.

COMPARATIVE EXPERIMENT 1

Relative to this comparative example, the conditions for the display device were established to the substantially the same as the case for Example 1, except that the twist angle was set at 75°, $\Delta$nd was 0.48 μm and $\theta$ was 10°. The C.R. was 1:6 and $Y_{off}$ was 81%. It was found that the best characteristics for this example are achieved when the twist angle is as indicated above, i.e., 75°. The conditions wherein a contrast ratio greater than 1:5 can be obtained is very narrow and elusive so that an acceptable display cannot be achieved under the foregoing conditions.

COMPARATIVE EXPERIMENT 2

Relative to this comparative example, the conditions for the display device were established to the substantially the same as the case for Example 2, except that the twist angle was set at 165°, $\Delta$nd was 0.76 μm and $\theta$ was 46°. The C.R. was 1:10 and $Y_{off}$ was 61%. The multi-coloring effect across the display of this example was remarkably increased as compared with Example 2 so that an acceptable display cannot be achieved under the foregoing conditions.

COMPARATIVE EXPERIMENT 3

Relative to this comparative example, the conditions for the display device were established to the substantially the same as the case for Example 3, except that the twist angle was set at 285°, $\Delta$nd was 0.70 μm and $\theta$ was 20°. The C.R. was 1:2 and $Y_{off}$ was 82%. It was found that the best characteristics for this example are achieved when the twist angle is as indicated above, i.e., 285°. The conditions wherein a contrast ratio greater than 1:5 can be obtained is very narrow and elusive so that an acceptable display cannot be achieved under the foregoing conditions.

While the invention has been described in conjunction with several specific embodiments, it is evident to those skilled in the art that many further alternatives, modifications and variations will be apparent in light of the foregoing description. For example, in connection with the foregoing examples, the twist angle is increased in increments of 5°, which is purely for the convenience of experimental illustration so that twist angles between these increments are equally applicable, taken within the prescribed range of values. Thus, the invention described herein is intended to embrace all such alternatives, modifications, applications and variations as may fall within the spirit and scope of the appended claims.

What is claimed is:

1. A reflective type liquid crystal display device with enhanced brightness and contrast ratio comprising:
   a liquid crystal cell of the optical anisotropic type having a twist oriented liquid crystal medium of molecules interposed between a pair of substrates supported in spatial relation.
   a polarizer positioned relative to one of said substrates.
   a reflector positioned relative to the other of said substrates and having a reflecting surface to return the light through said liquid crystal cell and said polarizer.
   said liquid crystal permitting light propagating from said liquid crystal cell to said reflector to be substantially linearly polarized.
   wherein an angle, $\theta$, is formed with axis of polarization of said polarizer in a counterclockwise direction from the major axial direction of orientation of liquid crystal molecules at a surface of said one substrate,
   wherein when said liquid crystal cell under conditions of an OFF state has a twist angle in said counterclockwise direction in the range from 0° through 70°, the amount of retardation, $\Delta$nd, is in the range from 0.2 μm through 0.7 μm, and the angle, $\theta$, is in the range of 35° through 115°, and wherein when said liquid crystal cell under conditions of an OFF state has a twist angle in said counterclockwise direction in the range from 170° through 270°, and the amount of retardation, $\Delta$nd, is in the range from 0.4 μm through 1.0 μm.

2. The reflective type liquid crystal display device according to claim 1 wherein at least one of said liquid crystal cell substrates is provided with a light scattering surface having surface roughness height in the range from 0.1 μm to and including 2 μm.

3. The reflective type liquid crystal display device according to claim 2 wherein said surface roughness is provided relative to said reflector.

4. The reflective type liquid crystal display device according to claim 1 wherein said reflector is provided on a surface of said liquid crystal cell of said other substrate.

5. The reflective type liquid crystal display device according to claim 4 wherein said reflector surface is provided with a surface roughness height in the range from 0.1 μm to and including 2 μm.

6. The reflective type liquid crystal display device of claim 1 wherein when said twist angle in said counterclockwise direction is in the range of 175° through 210°, the amount of retardation, $\Delta$nd, is in the range from 0.51 μm through 0.75 μm, and the angle, $\theta$, is in the range of 42° through 71°, and wherein when said twist angle in said counterclockwise direction is in the range of 250° through 265°, the amount of retardation, $\Delta$nd, is in the range from 0.55 μm through 0.96 μm, and an angle, $\theta$, is in the range of −2° through 30°.

7. A liquid crystal display device with enhanced brightness and contrast ratio comprising:
   a liquid crystal cell of the optical anisotropic type having twist oriented liquid crystal molecules interposed between a pair of substrates supported in spatial relation, an electrode formed on each of said substrates for applying a voltage across said liquid crystal cell (ON state) or removing a voltage from across said liquid crystal cell (OFF state), one of the electrode/substrate combinations being transparent and wherein the substrate thereof has a rubbing direction with the orientation of liquid crystal molecules at a surface of said substrate being in a first direction, a linear polarizer formed on said one electrode/substrate combination having a direction of polarization in a second direction so that an angle, $\theta$, is defined as the angle from said first direction to said second direction in a counterclockwise direction, a reflecting element formed on the other of said electrode/substrate combination, the values of twist angle, retardation, $\Delta$nd, and the angle, $\theta$, selected such that the light entering through said linear polarizing means and reaching said reflecting element is substantially linearly polarized in said OFF state to achieve optimized brightness, wherein said twist angle is respectively in the range of 0° to 70° and 170° to 270°, said retardation, $\Delta$nd, is in the range of 0.2 $\mu$m to 1.0 $\mu$m in said OFF state and the range of said angle, $\theta$, is respectively in the range of 35° to 115° and $-2°$ to 30° to achieve optimized brightness of around 80% in said OFF state and a maximized contrast ratio above 1:5 in said ON state.

8. The liquid crystal display device of claim 7 wherein said reflecting element is provided with a light scattering surface to significantly reduce double imaging from said other electrode/substrate combination.

9. The liquid crystal display device of claim 8 wherein said light scattering surface has a surface roughness height in the range from 0.1 $\mu$m to and including 2 $\mu$m.

* * * * *